(12) United States Patent
Yanagiwara et al.

(10) Patent No.: US 11,647,142 B2
(45) Date of Patent: May 9, 2023

(54) IMAGE READING APPARATUS

(71) Applicant: CANON KABUSHIKI KAISHA, Tokyo (JP)

(72) Inventors: Yuichi Yanagiwara, Kanagawa (JP); Kimihiko Fukawa, Kanagawa (JP); Takashi Sakai, Kanagawa (JP); Norikazu Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/484,710

(22) Filed: Sep. 24, 2021

(65) Prior Publication Data

US 2022/0103712 A1 Mar. 31, 2022

(30) Foreign Application Priority Data

Sep. 29, 2020 (JP) .............................. JP2020-163884

(51) Int. Cl.
H04N 1/04 (2006.01)
H04N 1/00 (2006.01)
H04N 1/031 (2006.01)

(52) U.S. Cl.
CPC ....... H04N 1/0405 (2013.01); H04N 1/00822 (2013.01); H04N 1/031 (2013.01); H04N 2201/0094 (2013.01)

(58) Field of Classification Search
CPC ........ B25J 13/088; G01B 11/03; G01B 5/008; G05B 2219/37274; G05B 2219/40305; H04N 1/00822; H04N 1/031; H04N 1/0405; H04N 2201/0094; G02B 26/106; G06K 17/0022; G06K 2207/1012; G06K 2207/1016; G06K 2207/1017; G06K 2207/1018; G06K 7/10; G06K 7/10564; G06K 7/10584; G06K 7/10594; G06K 7/10603; G06K 7/10663; G06K 7/10673; G06K 7/10693; G06K 7/10702; G06K 7/10792; G06K 7/10801; G06K 7/10811; G06K 7/10851; G06K 7/10861; G06K 7/10871; G06K 7/10881; G06K 7/10891; G06K 7/109; G06K 7/14; G06K 7/1443
USPC .......................................................... 358/474
See application file for complete search history.

(56) References Cited

U.S. PATENT DOCUMENTS

| 4,306,303 A * | 12/1981 | Hardy ................ H04Q 11/0407 370/371 |
| 5,532,841 A * | 7/1996 | Nakajima .......... H04N 1/33315 358/408 |
| 7,002,713 B2 | 2/2006 | Fukawa ........................ 358/483 |
| 7,016,534 B2 | 3/2006 | Fukawa et al. ............... 382/168 |

(Continued)

FOREIGN PATENT DOCUMENTS

JP  2017-147513  8/2017

Primary Examiner — Negussie Worku
(74) Attorney, Agent, or Firm — Venable LLP

(57) ABSTRACT

An image reading apparatus comprises a first reading unit configured to output an analog signal by reading an original, a second reading unit different from the first reading unit, a conversion unit configured to convert analog signals outputted from the first reading unit and the second reading unit to digital signals, a wire connection control unit configured to control wire connection between the first reading unit and the second reading unit, and the conversion unit, and an output control unit configured to control an output of an analog signal from the first reading unit.

13 Claims, 21 Drawing Sheets

(56) References Cited

U.S. PATENT DOCUMENTS

| | | | | |
|---|---|---|---|---|
| 7,529,003 | B2 | 5/2009 | Fukawa | 358/505 |
| 7,595,918 | B2 | 9/2009 | Amimoto et al. | 358/487 |
| 7,852,525 | B2 | 12/2010 | Nogami et al. | 358/497 |
| 8,953,233 | B2 | 2/2015 | Sakai | 358/509 |
| 9,444,966 | B2 | 9/2016 | Fukawa | H04N 1/00013 |
| 10,015,325 | B2 | 7/2018 | Honda | H04N 17/002 |
| 10,385,796 | B2 * | 8/2019 | Iwagami | F02D 41/266 |
| 10,554,844 | B2 | 2/2020 | Hosogoshi et al. | H04N 1/4076 |
| 10,721,372 | B2 | 7/2020 | Yanagiwara | H04N 1/00559 |
| 2004/0230358 | A1 * | 11/2004 | Stam | B60R 1/12 |
| | | | | 348/E5.043 |
| 2005/0152319 | A1 * | 7/2005 | Kubler | H04L 1/1671 |
| | | | | 370/349 |
| 2008/0013133 | A1 * | 1/2008 | Taguchi | H04N 1/393 |
| | | | | 358/514 |
| 2009/0195842 | A1 * | 8/2009 | Sasaki | H04N 1/1934 |
| | | | | 358/474 |
| 2017/0237873 | A1 * | 8/2017 | Watanabe | H04N 1/203 |
| | | | | 358/408 |
| 2020/0336689 | A1 * | 10/2020 | Akagi | H04N 1/00018 |
| 2020/0344374 | A1 * | 10/2020 | Takahashi | H04N 1/00037 |
| 2021/0067652 | A1 * | 3/2021 | Sato | H04N 1/00822 |
| 2021/0321013 | A1 * | 10/2021 | Ishido | H04N 1/00034 |
| 2022/0046138 | A1 * | 2/2022 | Mikami | H04N 1/00771 |

* cited by examiner

FIG. 9
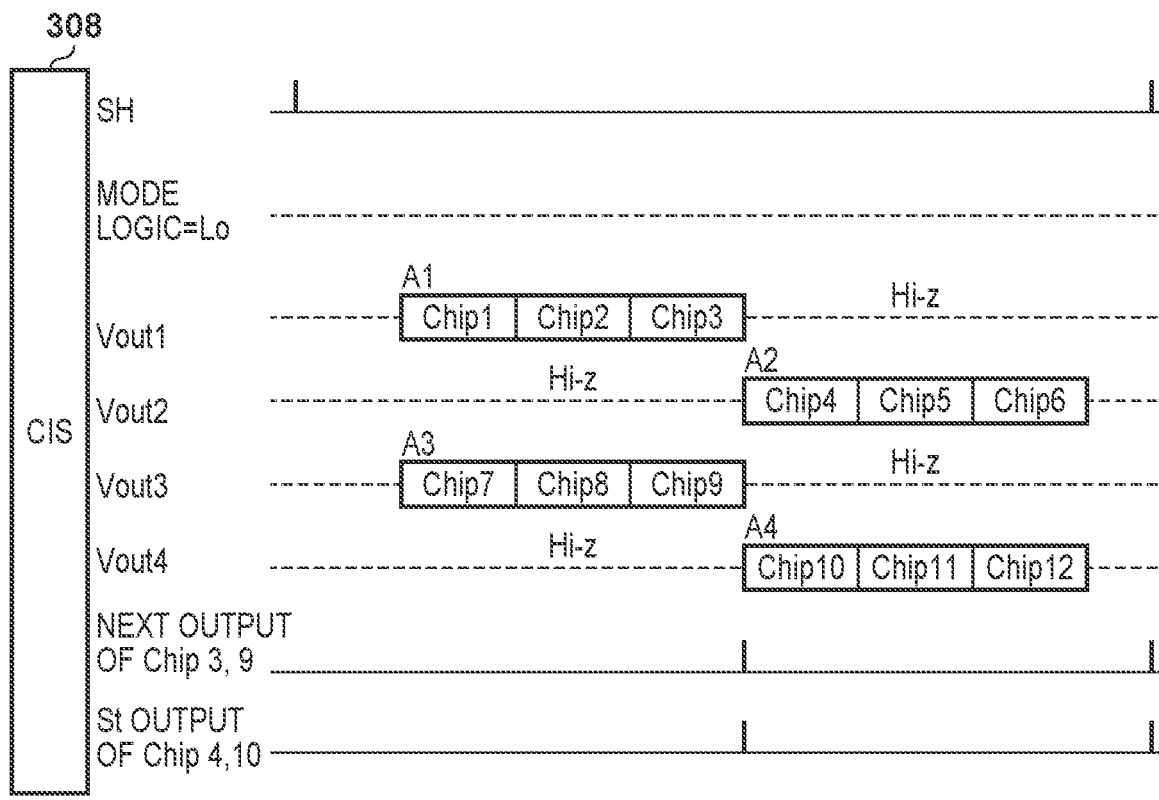
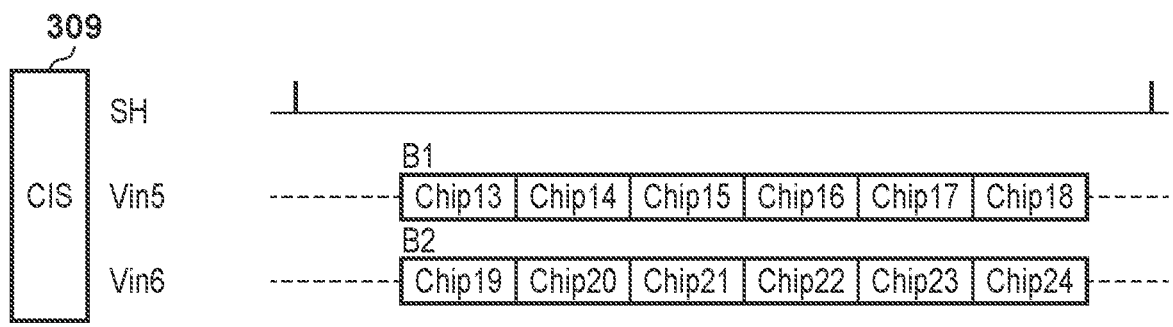
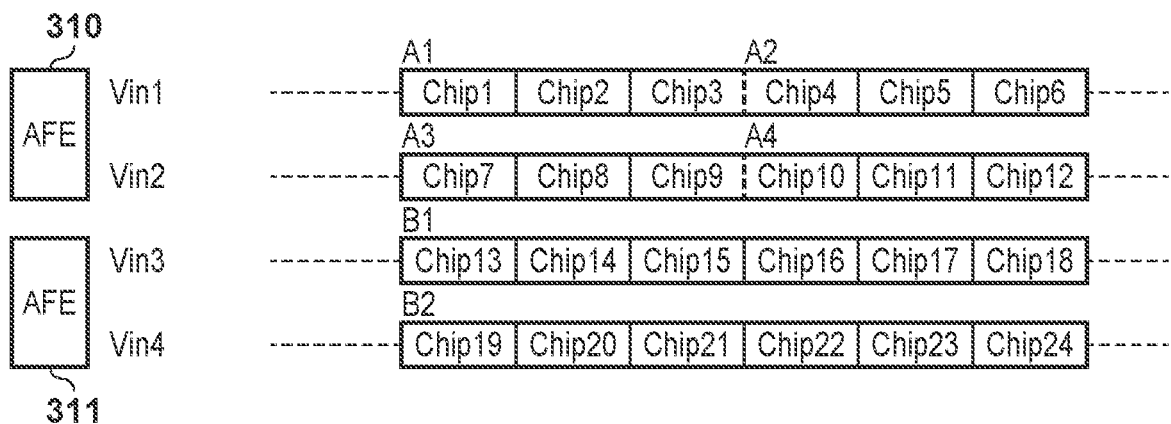

IMAGE READING APPARATUS

BACKGROUND OF THE INVENTION

Field of the Invention

The present invention relates to an image reading apparatus for reading an image of an original.

Description of the Related Art

In recent years, there has been a demand for an increase in reading speed in an image reading apparatus. Japanese Patent Laid-Open No. 2017-147513 discloses a configuration for increasing the speed at the time of single-sided reading by controlling the number of output channels for image sensor ICs in an image reading apparatus that supports simultaneous double-sided reading.

SUMMARY OF THE INVENTION

The present invention provides, with regard to image reading apparatuses capable of executing a plurality of reading modes, an image reading apparatus for improving reading efficiency with a simple configuration.

The present invention in one aspect provides an image reading apparatus comprising: a first reading unit configured to output an analog signal by reading an original; a second reading unit different from the first reading unit; a conversion unit configured to convert analog signals outputted from the first reading unit and the second reading unit to digital signals; a wire connection control unit configured to control a wire connection between the first reading unit and the second reading unit and the conversion unit; an output control unit configured to control an output of an analog signal from the first reading unit, wherein, in a first reading mode, the wire connection control unit is configured to control the wire connection such that analog signals outputted from a plurality of output channels of the first reading unit are respectively inputted to a plurality of input channels of the conversion unit, in a second reading mode different from the first reading mode, the wire connection control unit is configured to control the wire connection such that the analog signals outputted from the plurality of output channels of the first reading unit and analog signals outputted from a plurality of output channels of the second reading unit are inputted to the plurality of input channels of the conversion unit, and in the second reading mode, the output control unit is configured to control an output of analog signals such that a timing of an output of an analog signal from each of the plurality of output channels of the first reading unit to be inputted to one input channel of the conversion unit is shifted.

According to the present invention, it is possible to improve reading efficiency with a simple configuration in an image reading apparatus capable of executing a plurality of reading modes.

Further features of the present invention will become apparent from the following description of exemplary embodiments with reference to the attached drawings.

BRIEF DESCRIPTION OF THE DRAWINGS

FIG. 9 is a view illustrating a timing chart in a double-sided reading mode.

DESCRIPTION OF THE EMBODIMENTS

Figure 1:
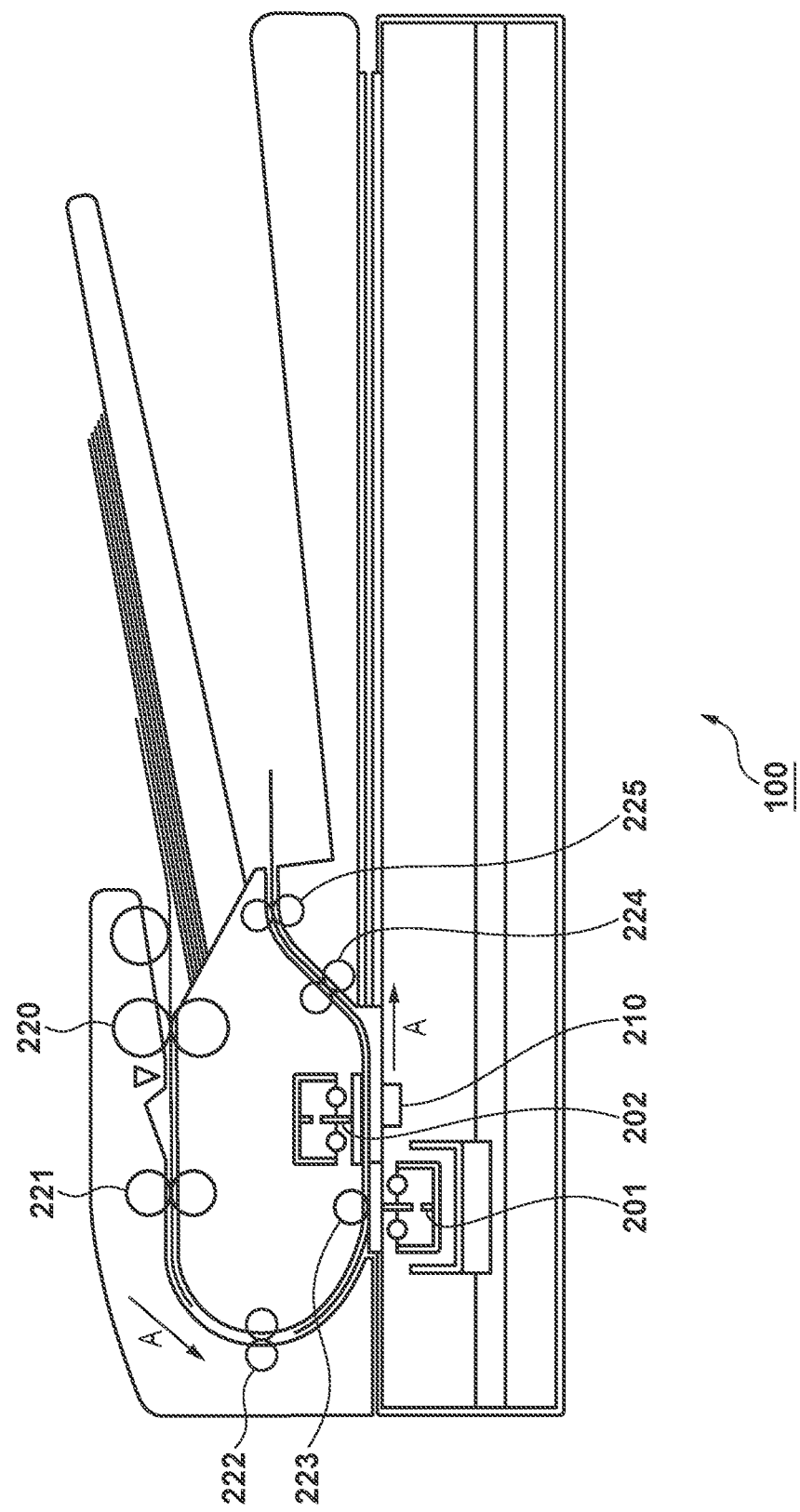
FIG. 1 is a lateral cross-sectional view of an image reading apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In Japanese Patent Laid-Open No. 2017-147513, it is necessary to provide image sensor ICs with a function for controlling the number of output channels for analog image data.

According to one aspect of the present invention, it is possible to improve reading efficiency with a simple configuration in an image reading apparatus capable of executing a plurality of reading modes.

First Embodiment

[Overall Configuration of Image Reading Apparatus]

FIG. 1 is a lateral cross-sectional view of an image reading apparatus 100 in the present embodiment. The image reading apparatus 100 will be described to have a configuration capable of simultaneously reading both sides of an original, which is a reading target. Incidentally, to be capable of simultaneous reading is not limited to cases where reading timings are strictly simultaneous (parallel) in the image reading apparatus 100. That is, it includes cases where in the image reading apparatus 100, it is possible to perform processing for reading the front side of an original, which is a reading target, and processing for reading the back side, which is on the back surface, of the original in a single conveyance of the original.

As illustrated in FIG. 1, the image reading apparatus 100 reads originals using contact image sensors (hereinafter, referred to as CISs), and includes a front side CIS 201, a back side CIS 202, and conveyance rollers 220 to 225 for conveying originals. The front side CIS 201 is a device for reading an image recorded on the front side of originals, and the back side CIS 202 is a device for reading an image recorded on the back side of originals. When performing double-sided reading of originals, the image reading apparatus 100 conveys an original, which is a reading target, in the direction of arrows A by the conveyance rollers 220 to 225. When the conveyed original reaches the reading position of the front side CIS 201, the front side CIS 201 reads an image. For example, emission light from an LED, which is a light source for illuminating originals, provided inside the front side CIS 201 is emitted onto the original, and by the front side CIS 201 reading the reflected light thereof, analog image data (hereinafter, also referred to as "analog signal") is generated. When the original reaches the reading position of the back side CIS 202, the back side CIS 202 reads an image. For example, emission light from an LED, which is a light source for illuminating originals, provided inside the back side CIS 202 is emitted onto the original, and by the back side CIS 202 reading the reflected light thereof, analog image data is generated.

The front side CIS 201 and the back side CIS 202 have a read width corresponding to the width of originals. The direction of the read width is the direction perpendicular to an arrow A. Hereinafter, this perpendicular direction is referred to as a main scanning direction, and the direction of conveyance originals indicated by the arrow A is referred to as a sub-scanning direction. In the present embodiment, by arranging the front side CIS 201 and the back side CIS 202 to face each other and conveying an original in the direction of the arrows A, images on both sides of the original can be read in parallel. Note that although description is given assuming that the front side and the back side of an original are read simultaneously, the positions of the front side CIS 201 and the back side CIS 202 do not need to be perfectly opposite to each other. That is, it is only necessary that the read surface of one CIS is arranged so as to partially face the read surface of the other CIS. Even with such a configuration, it is possible to perform the reading processing of the front side and the reading processing of the back side in parallel in one conveyance path. Further, each of the front side CIS 201 and the back side CIS 202 is provided with a blue LED, a red LED, and a green LED in order to read color images.

Light emitted by LEDs provided in the front side CIS 201 is reflected by an original, and the reflected light is imaged via a lens (not illustrated) onto the image sensor that the front side CIS 201 has. Then, the imaged reflected light is photoelectrically converted, and analog image data is generated. Meanwhile, light emitted by LEDs provided in the back side CIS 202 is reflected by an original, and the reflected light is imaged via a lens (not illustrated) onto the image sensor that the back side CIS 202 has. Then, the imaged reflected light is photoelectrically converted, and analog image data is generated.

Figure 2:
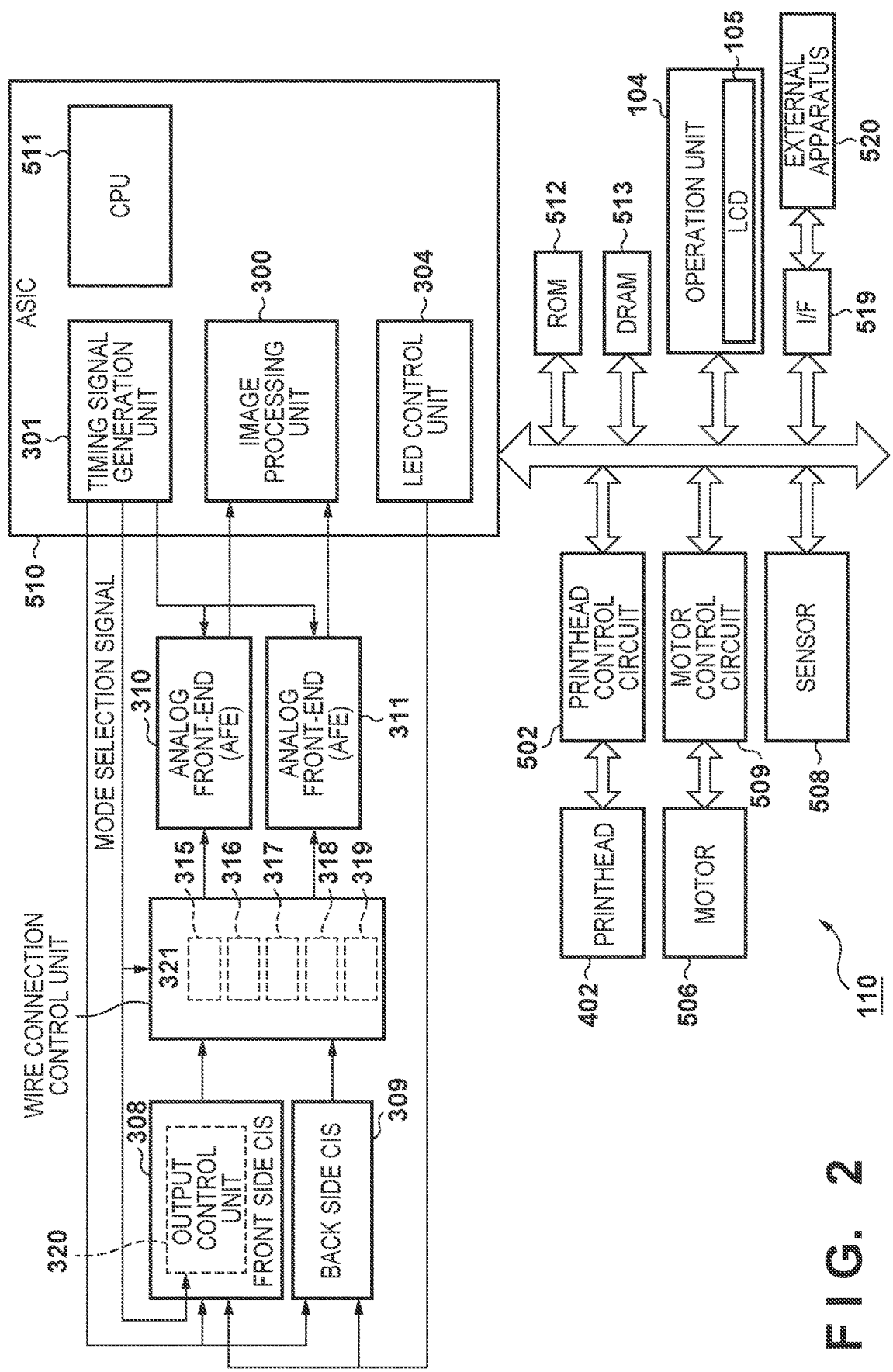
FIG. 2 is a view illustrating an internal configuration of a control circuit of an image reading apparatus.

FIG. 2 is a view illustrating an example of an internal configuration of a control circuit of the image reading apparatus 100. In FIG. 2, an example in which the image reading apparatus 100 is configured in a multi-function peripheral (hereinafter, referred to as MFP) having a read function and a print function will be described. An MFP 110 has a printhead control circuit 502, a motor control circuit 509, a sensor 508, an ASIC 510, a ROM 512, a DRAM 513, an operation unit 104, and an I/F 519, and each is connected so as to be able communicate with each other via a system bus. The ASIC 510 includes an image processing unit 300, a timing signal generation unit 301, an LED control unit 304, and a CPU 511, and performs control of the entire MFP 110, such as image reading and printing.

The CPU 511 is a central processing unit in the form of a microprocessor (microcomputer), and controls the operation of the entire MFP 110 by executing programs and starting up hardware. The ROM 512 is a non-volatile storage region and stores programs that support processing procedures executed by the CPU 511. The DRAM 513 is a volatile storage region that is used as a work area for the CPU 511 or temporarily stores parameters and image data for the CPU 511 to perform processing procedures.

The operation unit 104 can accept various operations of the user, and includes, for example, a hard key, a display unit for presenting (notifying) various information to the user, and the like. The operation unit 104 has an LCD 105 as a display unit. The display unit may be configured as a touch panel, for example. Further, configuration may be taken such that the operation unit 104 includes a voice generator or the like and is capable of outputting sound (buzzer, voice, etc.) based on sound information. The I/F 519 is an interface for communicating with an external apparatus 520. For example, a personal computer (PC) as the external apparatus 520 is connected via the I/F 519 with the MFP 110 to be able to perform communication. The external apparatus 520 is not limited to a PC, and may be another form of apparatus such as a portable terminal. For example, it is possible to perform input/output of image data between the MFP 110 and the external apparatus 520 via the I/F 519.

A printhead 402 and a motor 506 are controlled by the ASIC 510 via the printhead control circuit 502 and the motor control circuit 509, respectively. The printhead 402 has a mechanism for discharging ink droplets from nozzles. Further, the motor 506 includes a motor for driving rollers for conveying an original for reading and rollers for conveying sheets for printing.

The MFP 110 has, as a configuration of a read function, a front side CIS 308 (hereinafter, simply referred to as CIS 308), a back side CIS 309 (hereinafter, simply referred to as CIS 309), an analog front-end 310 (AFE 310), and an analog front-end 311 (AFE 311). The CIS 308 corresponds to the front side CIS 201 of FIG. 1, and the CIS 309 corresponds to the back side CIS 202 of FIG. 1. Analog image data outputted from the CIS 308 and the CIS 309 is inputted to the AFE 310 and the AFE 311 via a wire connection control unit 321. The wire connection control unit 321 is configured to include switching gates 315 to 319. Each switching gate is configured to select either one of input signals inputted from the two input terminals as an output target, and output it from one output terminal.

Each of the AFE 310 and the AFE 311 has two input channels. The AFE 310 and the AFE 311 are connected to the ASIC 510. The CIS 308 has four output channels for analog image data, and the output timing of analog image data can be switched by an output control unit 320. Details of the output timing will be described later. The CIS 309 has two output channel for analog image data. By the CPU 511 writing setting values to a register (not illustrated), the timing signal generation unit 301 supplies the CIS 308 and the CIS 309 with a horizontal synchronization signal SH and a clock signal required to drive each of these. Furthermore, the timing signal generation unit 301 supplies the output control unit 320 and the wire connection control unit 321 with a MODE selection signal.

MODE selection signals are generated by the CPU 511 writing setting values in the register (not illustrated) in accordance with a single-sided reading mode or a double-sided reading mode that can be selected by the user via the operation unit 104 or the external apparatus 520. For example, for the single-sided reading mode, by the CPU 511 writing 1 in the register (not illustrated), a High level signal is outputted as a MODE selection signal. For the double-sided reading mode, by the CPU 511 writing 0 in the register (not illustrated), a Low level signal is outputted as a MODE selection signal. In the present embodiment, the output timing of analog image data from the CIS 308 is switched by the output control unit 320 in accordance with the logic state of the MODE selection signal, that is, the reading mode. Furthermore, the input channels for analog image data to be inputted to the AFE 310 and the AFE 311 are switched by the wire connection control unit 321.

The LED control unit 304 performs lighting control of the LEDs (not illustrated) with which the CISs 308 and 309 are provided. Lighting control is performed by PWM control synchronized with the horizontal synchronization signal SH. Details will be described later for the CIS 308, the CIS 309, the output control unit 320, the wire connection control unit 321, the AFE 310, and the AFE 311. Note that although in the present embodiment, two AFEs having two input channels are used, the present invention may be configured with one AFE having four input channels.

[Configuration of CIS]

Figure 3:
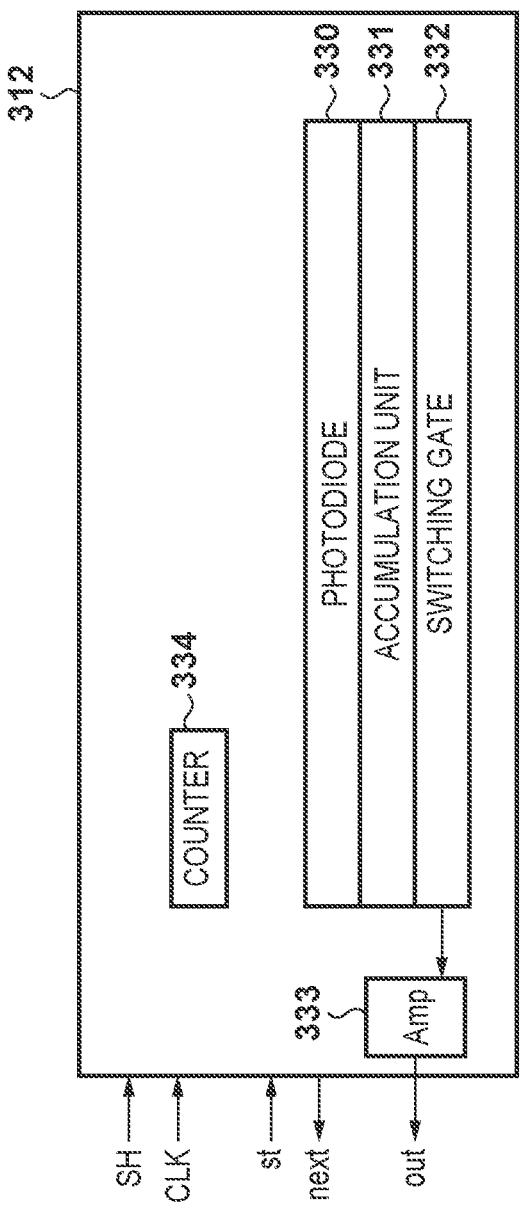
FIG. 3 is a view illustrating a configuration of an image sensor IC.
Figure 4:
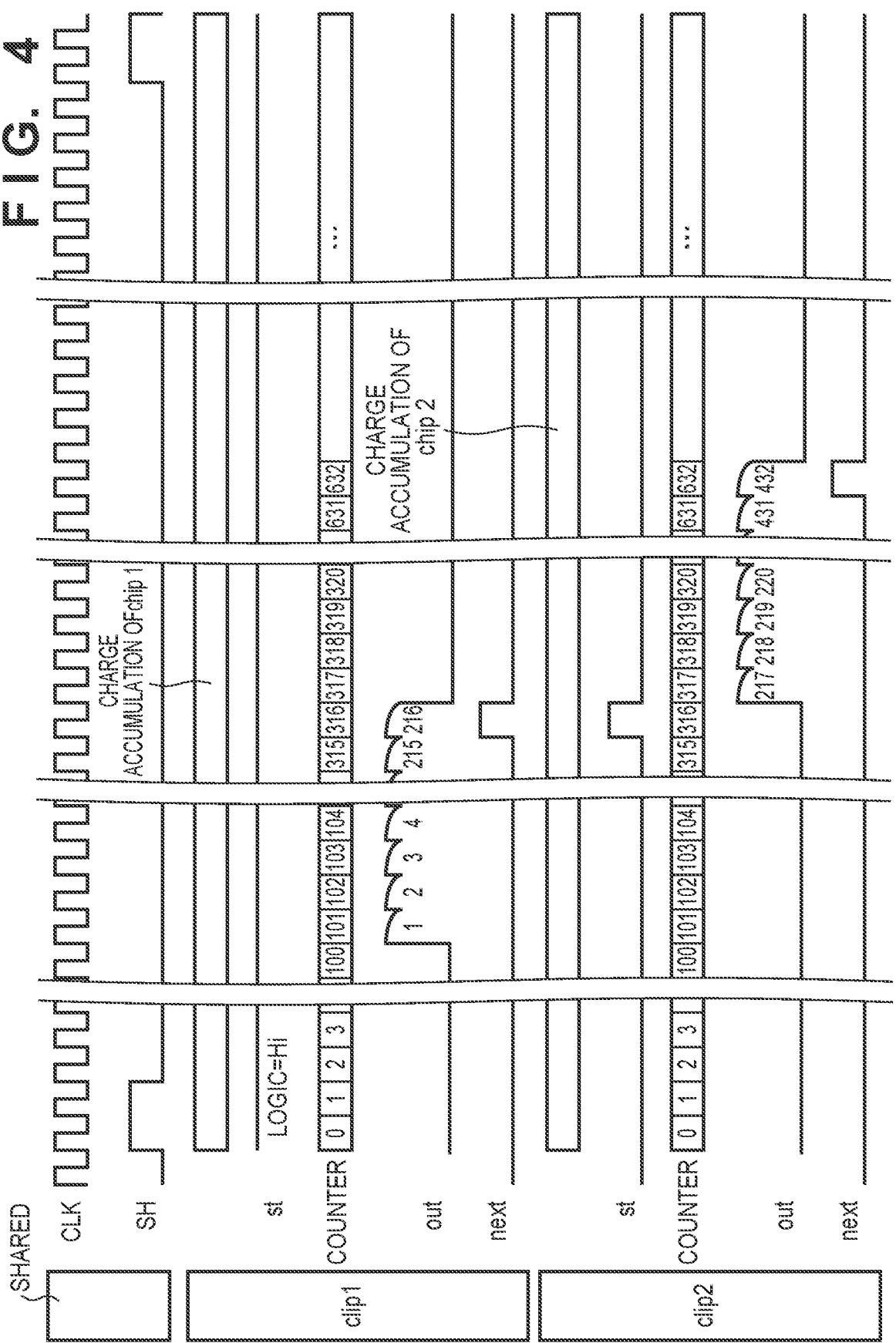
FIG. 4 is a view illustrating a timing chart of image sensor ICs.
Figure 5:
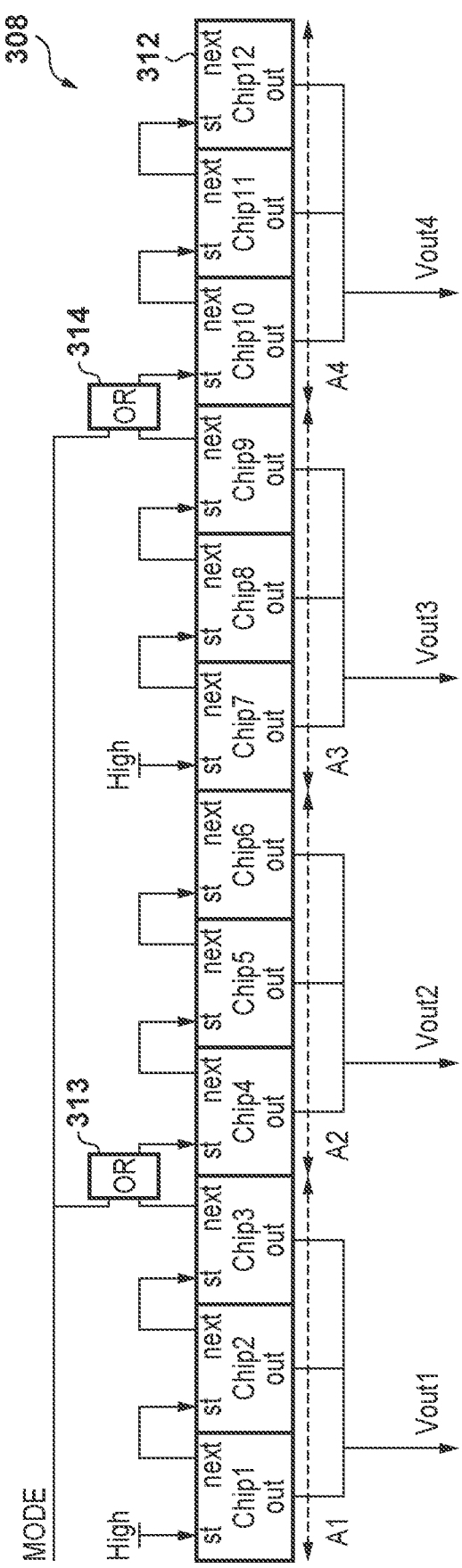
FIG. 5 is a view illustrating a configuration of connection of the image sensor ICs.

FIG. 3 is a view illustrating a configuration of an image sensor IC 312, and FIG. 4 is a view illustrating a timing chart of image sensor ICs 312. FIG. 5 is a view illustrating a configuration of connection of image sensor ICs for selectively switching the output timing of analog image data in a substrate of the CIS 308. As illustrated in FIG. 5, 12 image sensor ICs 312 (hereinafter, referred to as Chip 1 to Chip 12) are arranged on a substrate so that light reflected from an A4-sized (about 21 cm) reading target (original) can be read at once. The read and generated analog image data is outputted from four output channels (Vout1 to Vout4). As illustrated in FIG. 5, a plurality of image sensor ICs 312 are grouped so as to correspond to the respective output channels.

Description will be given for the configuration of the image sensor IC 312 of FIG. 3. A photodiode 330 has a plurality of photoelectric conversion elements arranged in a linear pattern, and photoelectrically converts received light. An accumulation unit 331 is arranged in parallel with the photodiode 330, and has a plurality of charge accumulation elements for accumulating signal charge, and a memory (not illustrated) for holding a voltage value obtained by voltage conversion of the accumulated charge. When the horizontal synchronization signal SH has risen, the electric charge of all the lines accumulated in the accumulation unit 331 is transferred to a switching gate 332, the accumulation unit 331 is reset, and light receiving in the photodiode 330 and charge accumulation in the accumulation unit 331 are started. Incidentally, the accumulation of charge is performed until the horizontal synchronization signal SH of the next line is inputted. The switching gate 332 holds the electric charge accumulated in the accumulation unit 331, and after a start signal (hereinafter, st signal) is inputted to an st terminal, the voltage value held in the memory is sequentially transferred one pixel at a time to an output circuit (Amp) 333 as analog image data. A counter 334 is caused to count up in synchronization with a pixel clock CLK. When all the pixels are outputted, a pulse signal is outputted from a next terminal as an output termination signal (hereinafter, referred to as next signal) for notifying the subsequent image sensor IC of the end of output. For example, when the next signal of the Chip 1 is inputted to the st terminal of Chip 2, the output of analog image data of Chip 2 is started. Detailed timing will be described later.

Description will be given for an operation timing chart of the image sensor ICs 312 of FIG. 4. Description will be given for the image sensor ICs 312 using the operations of the Chip 1 and the Chip 2 adjacent to each other illustrated in FIG. 5 as an example. When the horizontal synchronization signal SH generated by the timing signal generation unit 301 is inputted, the accumulation of charge is started in the Chip 1 and the Chip 2 as described above. Then, the count up of the counter 334 is started in synchronization with the pixel clock CLK generated by the timing signal generation unit 301. In the image sensor ICs 312, if the count value is 100 or more, the output of analog image data is started when an st signal is inputted. That is, in the Chip 1, when the count value is 100, a High state is entered, and the output of analog image data is started from out. That is, in the Chip 1, the output of analog image data is started when the count value reaches 100. For example, when reading at a resolution of 300 dpi, 216 pixels that the image sensor IC 312 has are sequentially outputted over count values=101 to 316. Then, when the last pixel of the Chip 1 is outputted (count value=316), a next signal is outputted from the Chip 1. The next signal outputted from the Chip 1 is inputted to the st terminal of the Chip 2, and the output of analog image data of the Chip 2 is started from the next count value (count value=317). For example, when reading at a resolution of 300 dpi, 216 pixels that the image sensor IC 312 has are sequentially outputted over count values=317 to 632.

In FIG. 5, a region to be read by the Chip 1 to the Chip 3 is A1. The read analog image data of A1 is sequentially outputted from Vout1 among the output channels that the CIS 308 has. Also, a region to be read by the Chip 4 to the Chip 6 is A2. The read analog image data of A2 is sequentially outputted from Vout2 among the output channels that the CIS 308 has. Also, a region to be read by the Chip 7 to the Chip 9 is A3. The read analog image data of A3 is sequentially outputted from Vout3 among the output channels that the CIS 308 has. Also, a region to be read by the Chip 10 to the Chip 12 is A4. The read analog image data of A4 is sequentially outputted from Vout4 among the output channels that the CIS 308 has.

On the substrate, OR gates 313 and 314 are configured as the output control unit 320. The OR gate 313 takes a MODE selection signal outputted from the timing signal generation unit 301 and a next signal outputted from the Chip 3 as inputs, and outputs a logical sum thereof. The outputted signal is inputted to the Chip 4, that is, to the st terminal of the Chip 4, which is at the start of the adjacent group. If MODE=High, High is inputted to the st terminal of the Chip 4. That is, the output of the pixels of the Chip 4 is started using the horizontal synchronization signal SH as a trigger. If MODE=Low, the output of the pixels of the Chip 4 is started at the timing at which the next signal of the Chip 3 is inputted to the st terminal of the Chip 4, that is, after all pixels have been outputted from the Chip 3.

The OR gate 314 takes a MODE selection signal outputted from the timing signal generation unit 301 and a next signal outputted from the Chip 9 as inputs, and outputs a logical sum thereof. The outputted signal is inputted to the st terminal of the Chip 10. If MODE=High, High is inputted to the st terminal of the Chip 10. That is, the output of the pixels of the Chip 10 is started using the horizontal synchronization signal SH as a trigger. If MODE=Low, the output of the pixels of the Chip 10 is started at the timing at which the next signal of the Chip 9 is inputted to the st terminal of the Chip 10, that is, after all pixels have been outputted from the Chip 9.

Note that the output control unit 320 is not limited to OR gates. For example, instead of the OR gate 313, a switch may be used such that when MODE=High, High is outputted, and when MODE=Low, a next signal of the Chip 3 is outputted. The st terminals of the Chip 1 and the Chip 7 are fixed at High.

Figure 6:
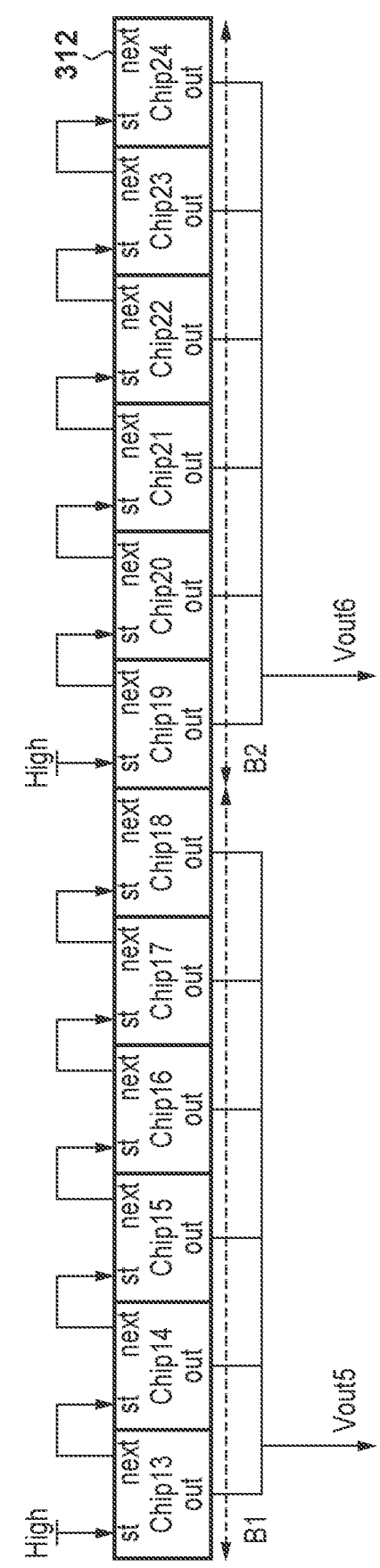
FIG. 6 is a view illustrating a configuration of connection of the image sensor ICs.

FIG. 6 is a view illustrating a configuration of connection of image sensor ICs in a substrate of the CIS 309. 12 image sensor ICs 312 (hereinafter, referred to as Chip 13 to Chip 24) are arranged on a substrate so that light reflected from an A4-sized (about 21 cm) reading target (original) can be read at once. The read analog image data is outputted from two output channels (Vout5 to Vout6).

In FIG. 6, a region to be read by the Chip 13 to the Chip 18 is B1. The read analog image data of B1 is sequentially outputted from Vout5 among the output channels that the CIS 309 has. Also, a region to be read by the Chip 19 to the Chip 24 is B2. The read analog image data of B2 is sequentially outputted from Vout6 among the output channels that the CIS 309 has. The st terminals of the Chip 13 and the Chip 19 are fixed at High.

[Operation of Each Reading Mode]

Figure 7:
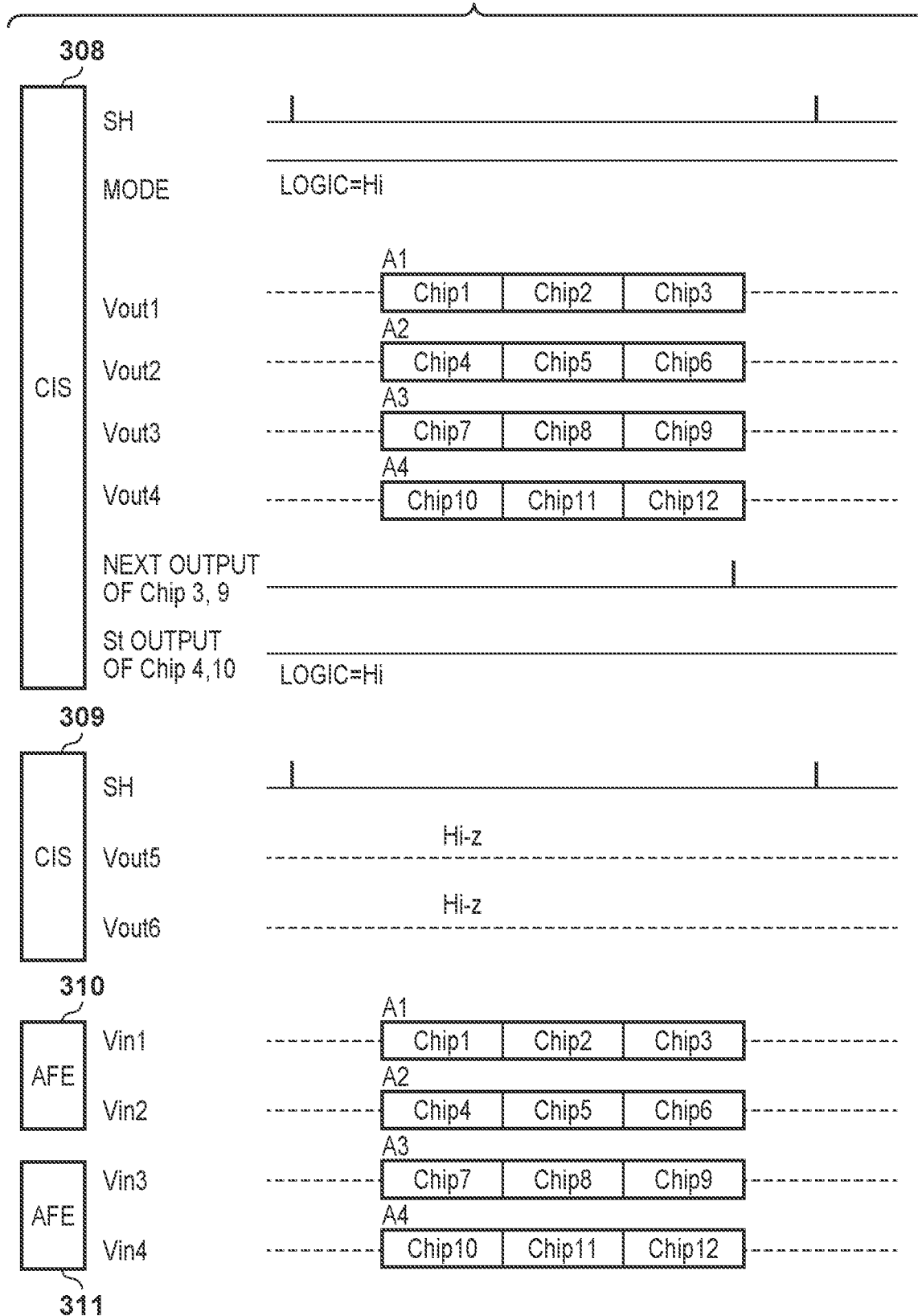
FIG. 7 is a view illustrating a timing chart in a single-sided reading mode.
Figure 8:
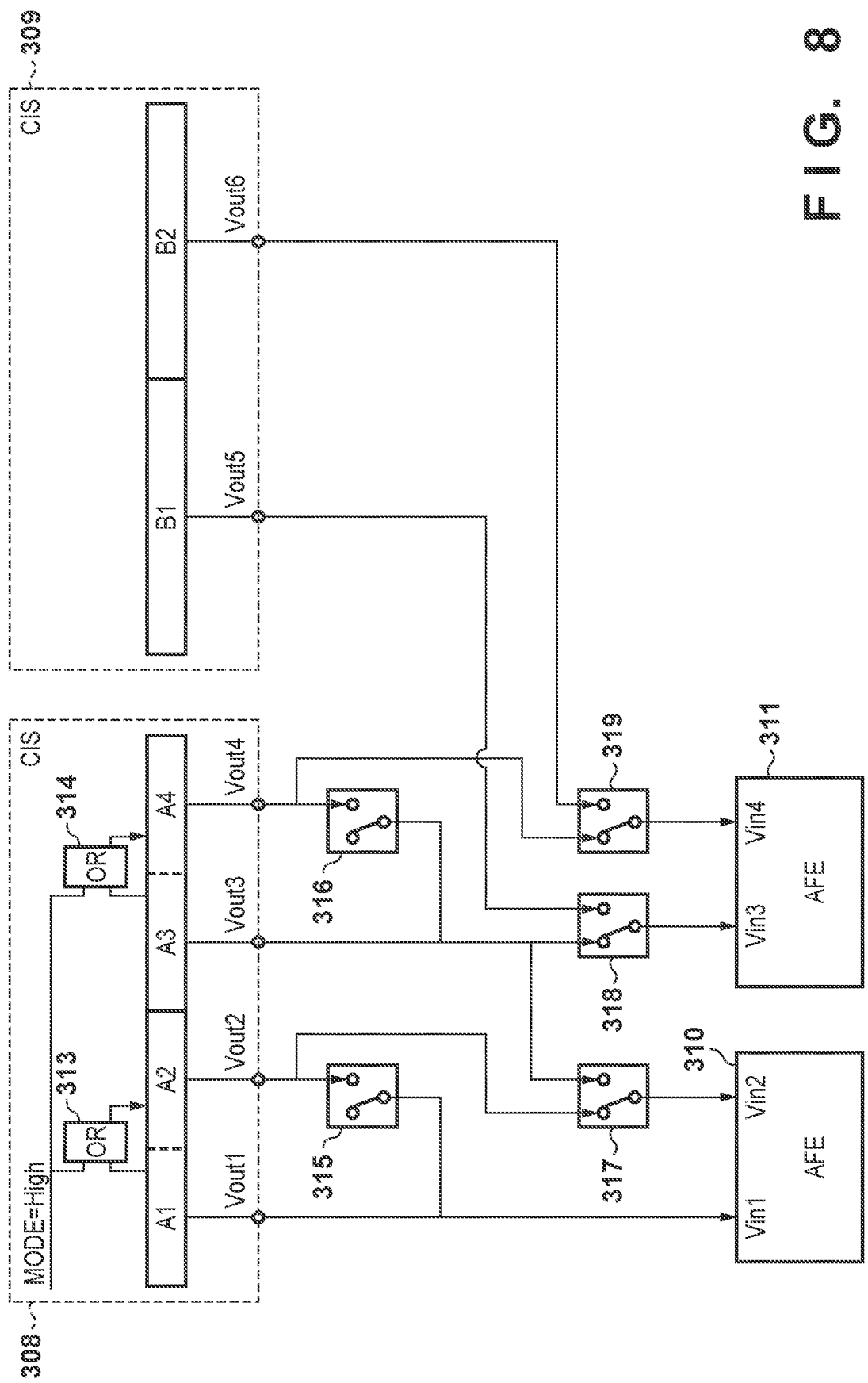
FIG. 8 is a view illustrating wire connections between CISs and AFEs in the single-sided reading mode.

The operation of the single-sided reading mode will be described. FIG. 7 is a view illustrating a timing chart of analog image data outputs of the CIS 308 and the CIS 309 and the analog image data inputs to the AFEs in the single-sided reading mode. FIG. 8 is a view illustrating wire connection in which the analog image data outputted from the CIS 308 and the CIS 309 in the single-sided reading mode is inputted to the AFE 310 and the AFE 311 via the switching gates 315 to 319. In FIG. 8, the configurations illustrated in FIGS. 5 and 6 have each been simplified for the CIS 308 and the CIS 309. The AFE 310 has two input channels, which are Vin1 and Vin2, respectively. The AFE 311 has two input channels, which are Vin3 and Vin4, respectively.

The output of analog image data of the CIS 308 in the single-sided reading mode will be described. In the single-sided reading mode, the timing signal generation unit 301 outputs a MODE selection signal fixed at High. When the horizontal synchronization signal SH is inputted, the output of analog image data of the Chip 1 and the Chip 7 whose st terminals are fixed to High is started. Since High is inputted to the st terminals of the Chip 4 and the Chip 10 by the respective outputs of the OR gates 313 and 314, the output of analog image data of the Chip 4 and the Chip 10 are started. When the output of analog image data is completed, the next signals of the Chip 1, the Chip 4, the Chip 7, and the Chip 10 are inputted to the st terminals of the Chip 2, the Chip 5, the Chip 8, and the Chip 11, respectively. Then, the output of analog image data of the Chip 2, the Chip 5, the Chip 8, and the Chip 11 is started. When the output of analog image data of the Chip 2, the Chip 5, the Chip 8, and the Chip 11 is completed, next signals of the Chip 2, the Chip 5, the Chip 8, and the Chip 11 are inputted to the st terminals of the Chip 3, the Chip 6, the Chip 9, and the Chip 12, respectively. Then, the output of analog image data of the Chip 3, the Chip 6, the Chip 9, and the Chip 12 is started. When the output of analog image data of the Chip 3, the Chip 6, the Chip 9, and the Chip 12 is completed, next signals of the Chip 3, the Chip 6, the Chip 9, and the Chip 12 are outputted (connection destinations are open circuits), and Vout1 to Vout4 become Hi-z. Vout1 to Vout4 of FIG. 7 indicate the above outputs of analog image data.

The output of analog image data of the CIS 309 in the single-sided reading mode will be described. Since the CIS 309 is not used in the single-sided reading mode, a control signal such as a horizontal synchronization signal SH from the timing signal generation unit 301 is not supplied to the CIS 309. As a result, as illustrated in FIG. 7, the outputs of Vout5 and Vout6 become Hi-z.

Note that output channels (Vout2, Vout4) whose output timings are switched by the output control unit 320 are referred to as variable channels, and the others are referred to as fixed channels.

The input of analog image data to the AFE 310 and the AFE 311 in the single-sided reading mode will be described. Analog image data outputted from the CIS 308 and the CIS 309 is inputted to the AFE 310 and the AFE 311 via switching gates 315 to 319. Each of the switching gates 315 to 319 has two input terminals, and selects a signal to be outputted by a MODE selection signal outputted from the timing signal generation unit 301. Vin1 of the AFE 310 takes only the analog image data of the A1 region as input when the switching gate 315 blocks the analog image data of the A2 region. Vin2 of the AFE 310 takes the analog image data of the A2 region as input when the analog image data of the A2 region is allowed to pass by the switching gate 317.

Vin3 of the AFE 311 takes the analog image data of the A3 region as input when the switching gate 316 blocks the analog image data of the A4 region, and only the analog image data of the A3 region is allowed to pass by the switching gate 318. Vin4 of the AFE 311 takes the analog image data of the A4 region as input when the analog image data of the A4 region is allowed to pass by the switching gate 319. Vout1 to Vout4 of FIG. 7 indicate the above inputs of analog image data.

Figure 10:
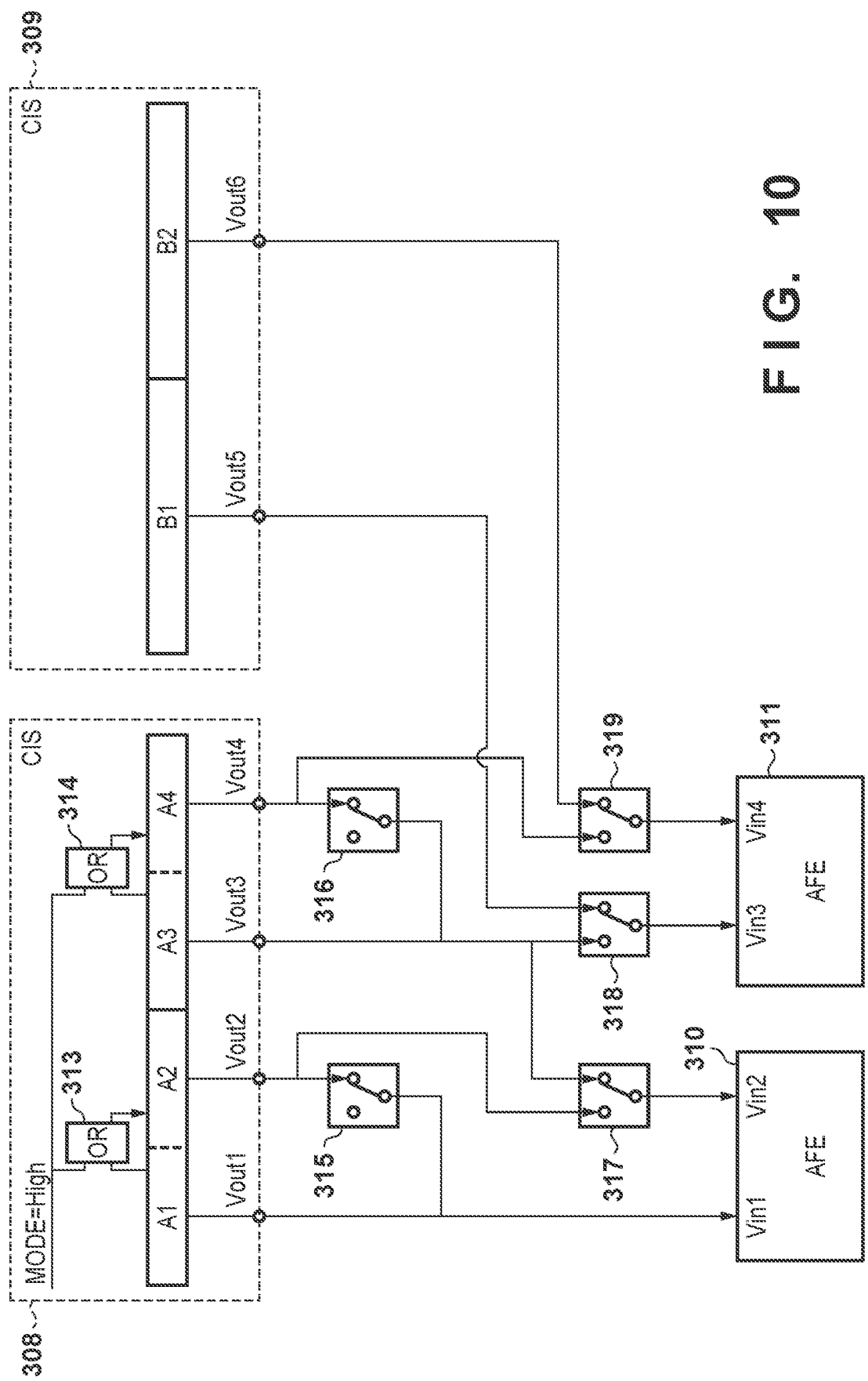
FIG. 10 is a view illustrating wire connections between CISs and AFEs in the double-sided reading mode.

Next, the operation of the double-sided reading mode will be described. FIG. 9 is a view illustrating a timing chart of analog image data outputs of the CIS 308 and the CIS 309 and the analog image data inputs to the AFEs in the double-sided reading mode. FIG. 10 is a view illustrating wire connection in which the analog image data outputted from the CIS 308 and the CIS 309 in the double-sided reading mode is inputted to the AFE 310 and the AFE 311 via the switching gates 315 to 319. In FIG. 10, the configurations illustrated in FIGS. 5 and 6 have each been simplified for the CIS 308 and the CIS 309. The AFE 310 has two input channels, which are Vin1 and Vin2, respectively. The AFE 311 has two input channels, which are Vin3 and Vin4, respectively.

The output of analog image data of the CIS 308 in the double-sided reading mode will be described. In the double-sided reading mode, the timing signal generation unit 301 outputs a MODE selection signal fixed at Low. When the horizontal synchronization signal SH is inputted, the output of analog image data of the Chip 1 and the Chip 7 whose st terminals are fixed to High is started. Note that, the next signals of the Chip 3 and the Chip 9 are respectively inputted to the st terminals of the Chip 4 and the Chip 10 as the respective outputs of the OR gates 313 and 314. Therefore, the output is not started at this point in time, and Vout2 and Vout4 become Hi-z as illustrated in FIG. 9. When the output of analog image data is completed, the next signals of the Chip 1 and the Chip 7 are inputted to the st terminals of the Chip 2 and the Chip 8, respectively, and the output of analog image data of the Chip 2 and the Chip 8 is started. When the output of analog image data is completed, the next signals of the Chip 2 and the Chip 8 are inputted to the st terminals of the Chip 3 and the Chip 9, respectively, and the output of analog image data of the Chip 3 and the Chip 9 is started.

When the output of analog image data is completed, Vout1 and Vout3 become Hi-z, and the next signals of the Chip 3 and the Chip 9 are inputted to the st terminals of the Chip 4 and the Chip 10 via the OR gates 313 and 314, respectively. Then, the output of analog image data of the Chip 4 and the Chip 10 is started. That is, the output will be transmitted on the signal line, where the output start timings of the Chip 4 and the Chip 10 (in other words, the output start timings of Vout2 and Vout4) are delayed by three chips with respect to the single-sided reading. When the output of analog image data is completed, the next signals of the Chip 4 and the Chip 10 are inputted to the st terminals of the Chip 5 and the Chip 11, respectively, and the output of analog image data of the Chip 5 and the Chip 11 is started. When the output of analog image data is completed, the next signals of the Chip 5 and the Chip 11 are inputted to the st terminals of the Chip 6 and the Chip 12, respectively, and the output of analog image data of the Chip 6 and the Chip 12 is started. When the output of analog image data is completed, the next signals of the Chip 6 and the Chip 12 are outputted (connection destinations are open circuits), and Vout2 and Vout4 become Hi-z. Vout1 to Vout4 of FIG. 9 indicate the above outputs of analog image data.

The output of analog image data of the CIS 309 in the double-sided reading mode will be described. When the horizontal synchronization signal SH is inputted, the output of analog image data of the Chip 13 and the Chip 19 whose st terminals are fixed to High is started. When the output of analog image data is completed, the next signals of the Chip 13 and the Chip 19 are inputted to the st terminals of the Chip 14 and the Chip 20, respectively, and the output of analog image data of the Chip 14 and the Chip 20 is started. When the output of analog image data is completed, the next signals of the Chip 14 and the Chip 20 are inputted to the st terminals of the Chip 15 and the Chip 21, respectively, and the output of analog image data of the Chip 15 and the Chip 21 is started. When the output of analog image data is completed, the next signals of the Chip 15 and the Chip 21 are inputted to the st terminals of the Chip 16 and the Chip 22, respectively, and the output of analog image data of the Chip 16 and the Chip 22 is started. When the output of analog image data is completed, the next signals of the Chip 16 and the Chip 22 are inputted to the st terminals of the Chip 17 and the Chip 23, respectively, and the output of analog image data of the Chip 17 and the Chip 23 is started. When the output of analog image data is completed, the next signals of the Chip 17 and the Chip 23 are inputted to the st terminals of the Chip 18 and the Chip 24, respectively, and the output of analog image data of the Chip 18 and the Chip 24 is started. When the output of analog image data is completed, the next signals of the Chip 18 and the Chip 24 are outputted (connection destinations are open circuits), and Vout5 and Vout6 become Hi-z. Vout5 and Vout6 of FIG. 9 indicate the above outputs of analog image data.

The input of analog image data to the AFE 310 and the AFE 311 in the double-sided reading mode will be described. Vin1 of the AFE 310 takes the analog image data of the A1 region and the analog image data of the A2 region as input in time series by wired-OR by allowing the analog image data of the A2 region to pass by the switching gate 315. Regarding Vin2 of the AFE 310, the analog image data of the A3 region and the analog image data of the A4 region are configured to be in a wired-OR by allowing the analog image data of the A4 region to pass by the switching gate 316. Then, Vin2 of the AFE 310 takes as input a wired-OR of the analog image data of the A3 region and the analog image data of the A4 region as input in time series by the wired-ORed analog image data being allowed to pass by the switching gate 317.

Vin3 of the AFE 311 takes the analog image data of the B1 region as input by the analog image data of the B1 region being allowed to pass by the switching gate 318. Vin4 of the AFE 311 takes the analog image data of the B2 region as input by the analog image data of the B2 region being allowed to pass by the switching gate 319. Vout1 to Vout4 of FIG. 9 indicate the above inputs of analog image data.

Further, in the present embodiment, the switching gates 315 and 316 may be arranged on the CIS substrate of the CIS 308. Note that although the switching gates 315 and 316 use a switch with two inputs and one output, it may be a switch with one input and one output. Also, the CIS 309 has two output channels for analog image data, but may be configured to have four output channels for analog image data as in the CIS 308, and may be able to switch output timings.

[Operation Flow]

Figure 11:
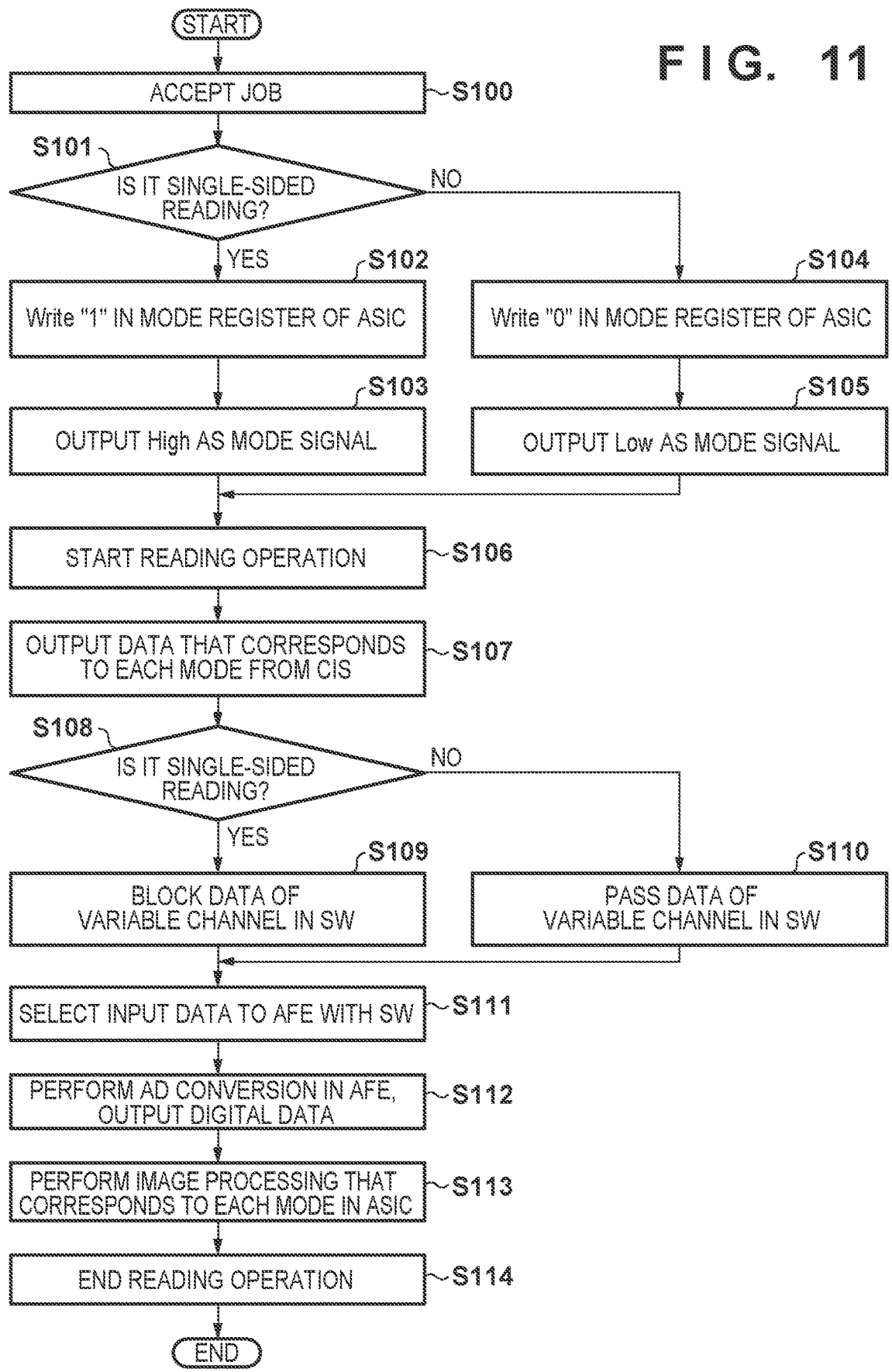
FIG. 11 is a flowchart illustrating a scan operation of the image reading apparatus.

FIG. 11 is a flowchart illustrating a reading operation of the image reading apparatus 100 in the present embodiment. The processing of FIG. 11 is realized, for example, by the CPU 511 reading a program stored in the ROM 512 to the DRAM 513 and executing it. In step S100, the ASIC 510 accepts a single-sided reading or simultaneous double-sided reading job (hereinafter, double-sided reading) inputted by the user via the operation unit 104 or the external apparatus 520. The job here may include copying in which a scanned image is printed. In step S101, the ASIC 510 determines, based on the accepted job, which reading mode (the single-sided reading or the double-sided reading) is selected. If it is determined that single-sided reading is selected (YES in step S101), the processing proceeds to step S102, and if it is determined that double-sided reading is selected (NO in step S101), the processing proceeds to step S104.

If it is determined that single-sided reading is selected, the CPU 511, in step S102, writes "1" to the mode register (not illustrated) of the ASIC 510. In step S103, the ASIC 510 outputs High as the MODE selection signal based on the setting of the mode register and, in step S106, starts the reading operation. Meanwhile, if it is determined that double-sided reading is selected, the CPU 511, in step S104, writes "0" to the mode register (not illustrated) of the ASIC 510. In step S105, the ASIC 510 outputs Low as the MODE selection signal based on the setting of the mode register and, in step S106, starts the reading operation.

In step S107, the CIS 308 and the CIS 309 output the analog image data corresponding to the respective reading modes in accordance with the set signal, and the processing proceeds to step S108. Note that the output in step S107 is executed as described in FIGS. 7 and 9.

In step S108, the ASIC 510 determines, based on the accepted job, which reading mode (the single-sided reading or the double-sided reading) is selected. When it is determined that single-sided reading is selected (YES in step S108), the MODE selection signal is inputted to the switching gates 315 and 316 as High in step S109. Consequently, as illustrated in FIG. 8, the analog image data of the variable channels are blocked by the switching gates 315, 316 and the processing proceeds to step S111. Meanwhile, when it is determined that double-sided reading is selected (NO in step S108), the MODE selection signal is inputted to the switching gates 315 and 316 as Low in step S110. Consequently, as illustrated in FIG. 10, the analog image data of the variable channels respectively passes through the switching gates 315 and 316 and the processing proceeds to step S111.

In step S111, the switching gates 317 to 319 select analog image data to be inputted to the AFE 310 and the AFE 311 in accordance with the input value of the MODE selection signal inputted to the switching gates 317 to 319. Then, the selected analog image data is inputted to the AFE 310 and the AFE 311, and the processing proceeds to step S112. Note that in steps S109 to S111, operations as described in FIGS. 7 to 10 are performed.

In step S112, the ASIC 510 converts analog image data outputted from the CIS 308 and the CIS 309 into digital image data (also called digital signals). In step S113, the ASIC 510 performs image processing corresponding to the respective reading modes using the digital image data converted in step S112, and ends the reading operation in step S114. Thereafter, the processing of FIG. 11 ends.

As described above, even when the image sensor ICs having no dedicated switching function in the single-sided reading mode is used in the image reading apparatus 100 that supports simultaneous double-sided reading, the output channels of the CISs can be assigned to all the input channels that the AFEs have. As a result, the analog image data outputted from the respective output channels of the CISs can be inputted to the input channels of the AFEs in parallel, and as illustrated in FIGS. 7 and 9, the reading speed in single-sided reading can be increased in comparison to the double-sided reading.

Note that in the present embodiment, the output of the CIS 308 for the front side is configured by four channels, and the output of the CIS 309 for the back side is configured by two channels, but the present invention is not limited to this. For example, the present invention may be configured by another number of channels in accordance with the size of the sheet that the image reading apparatus 100 handles and the like.

Second Embodiment

[Overall Configuration of Image Reading Apparatus]

Hereinafter, a second embodiment will be described regarding points of difference from the first embodiment. In the first embodiment, it has been described that the processing efficiency in single-sided reading can be improved in the image reading apparatus 100 that simultaneously reads the front side and the back side of an original using two CISs. In the present embodiment, in the image reading apparatus 100, such as a large-format scanner, that reads wide originals by a plurality of arrays of a plurality of CISs in the main scanning direction, it is possible to improve the processing efficiency of reading a region that is narrower than (an original of a size smaller than) a region that can be read by the CISs.

Figure 12:
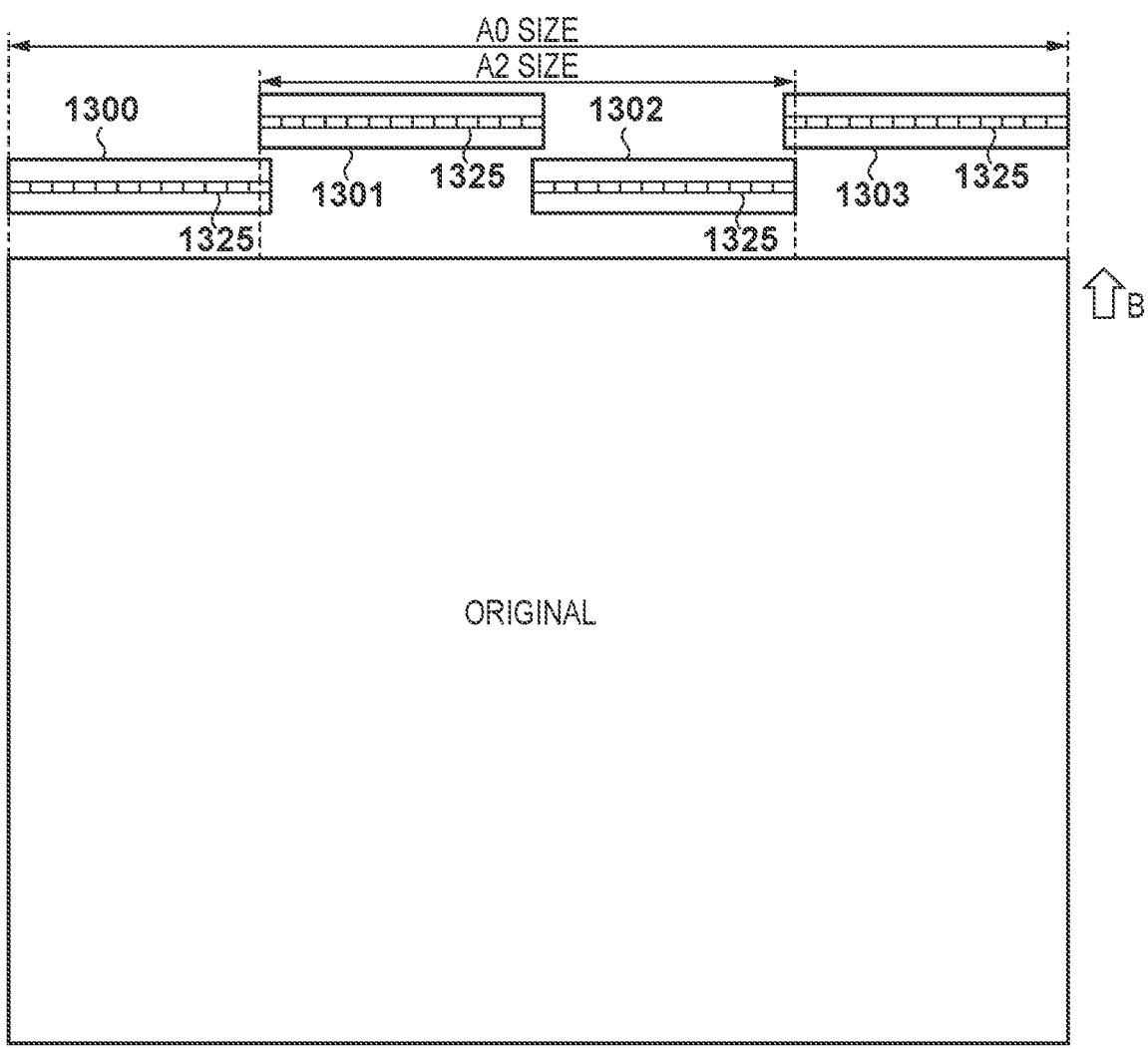
FIG. 12 is a view illustrating an arrangement of the CISs and an original.

FIG. 12 is a view illustrating an arrangement of CISs of the image reading apparatus 100 and an original in the second embodiment. CISs 1300 to 1303 are configured by arranging, in the main scanning direction, 12 image sensor ICs 1325 whose number of read pixels are 224 pixels at a resolution of 300 dpi. The read length of each CIS is, for example, about 22.7 mm. Each CIS is arranged side by side in the main scanning direction, but in the joint portions of each CIS, a staggered array is formed by an overlap in the sub-scanning direction as illustrated in FIG. 12 in consideration of variations in assembly. Then, by the conveyance of an original in the direction of an arrow B, the original, which is A0 size (about 84 cm) is read with the CISs 1300 to 1303. In the present embodiment, as illustrated in FIG. 12, it is also possible to read the A2 size (about 42 cm) using only the CIS 1301 and the CIS 1302, and the reading speed can be made faster than the reading speed of the A0 size.

Figure 13:
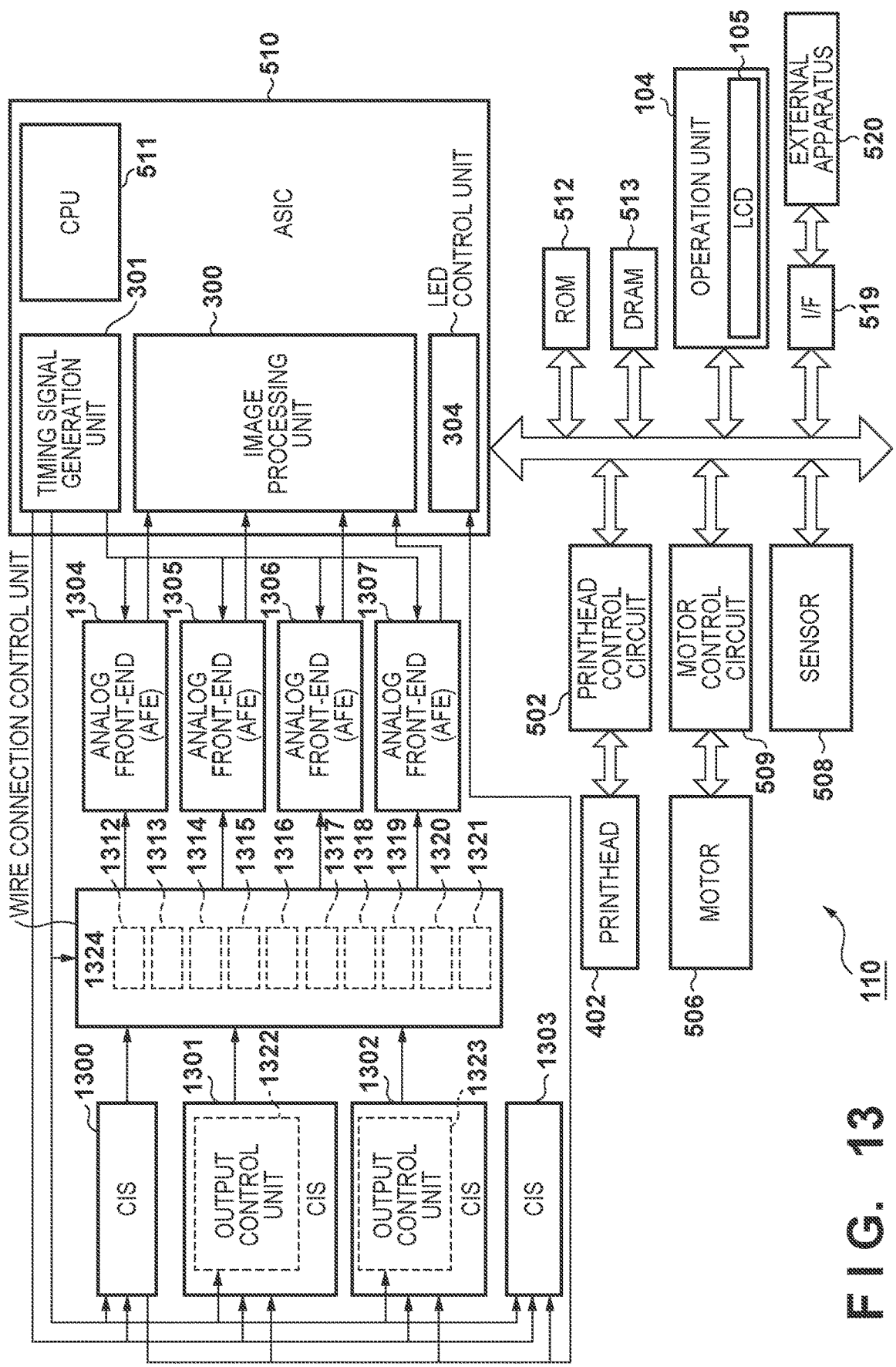
FIG. 13 is a view illustrating an internal configuration of the control circuit of the image reading apparatus.

FIG. 13 is a view illustrating an example of an internal configuration of a control circuit of the image reading apparatus 100 in the present embodiment. In FIG. 13, an example in which the image reading apparatus 100 is configured in a multi-function peripheral (hereinafter, referred to as MFP) having a read function and a print function will be described. Since the functions other than the read function are the same as those of FIG. 2, description thereof is omitted, and only the read function will be described. Also, the image reading apparatus 100 is not limited to the configuration illustrated in FIG. 13, and may be an image reading apparatus having only a read function, or may further include a FAX function or the like.

The analog image data outputted from the CIS 1300 to the CIS 1303 is inputted to an analog front-end 1304 (AFE 1304) to an analog front-end 1307 (AFE 1307) via a wire connection control unit 1324. The wire connection control unit 1324 is configured to include switching gates 1312 to 1321. Each switching gate is configured to select either one of the two input terminals, and output it from one output terminal.

Each of the AFE 1304 to the AFE 1307 has two input channels. The AFE 1304 to the AFE 1307 are connected to the ASIC 510. The CIS 1301 and the CIS 1302 have four output channels for analog image data, and the output timing of analog image data can be switched by the output control units 1322 and 1323, respectively. Details of the timing will be described later. The CIS 1300 and the CIS 1303 have two output channel for analog image data. By the CPU 511 writing setting values to a register (not illustrated), the timing signal generation unit 301 supplies the CIS 1300 and the CIS 1303 with a horizontal synchronization signal SH and a clock signal required to drive each of these. Furthermore, the timing signal generation unit 301 supplies the output control units 1322 and 1323 and the wire connection control unit 1324 with a MODE selection signal.

MODE selection signals are generated by the CPU 511 writing setting values in the register (not illustrated) in accordance with an A2-size reading mode or an A0-size reading mode that can be selected by the user via the operation unit 104 or the external apparatus 520. For example, for the A2-size reading mode, by the CPU 511 writing 1 in the register (not illustrated), a High level signal is outputted as a MODE selection signal. For the A0-size reading mode, by the CPU 511 writing 0 in the register (not illustrated), a Low level signal is outputted as a MODE selection signal. In the present embodiment, the output timing of analog image data from the CIS 1301 and the CIS 1302 is switched by the output control units 1322 and 1323 in accordance with the logic state of the MODE selection signal, that is, the reading mode. Furthermore, the input channels for analog image data to be inputted to the AFE 1304 to the AFE 1307 are switched by the wire connection control unit 1324.

The LED control unit 304 performs lighting control of the LEDs (not illustrated) with which the CISs 1300 to the CIS 1303 are provided. Lighting control is performed by PWM control synchronized with the horizontal synchronization signal SH. Details will be described later for the CIS 1300 to the CIS 1303, the output control units 1322 and 1323, the wire connection control unit 1324, and the AFE 1304 to the AFE 1307. Note that although in the present embodiment, four AFEs having two input channels are used, the present invention may be configured with two AFE having four input channels.

[Configuration of CIS]

Figure 14:
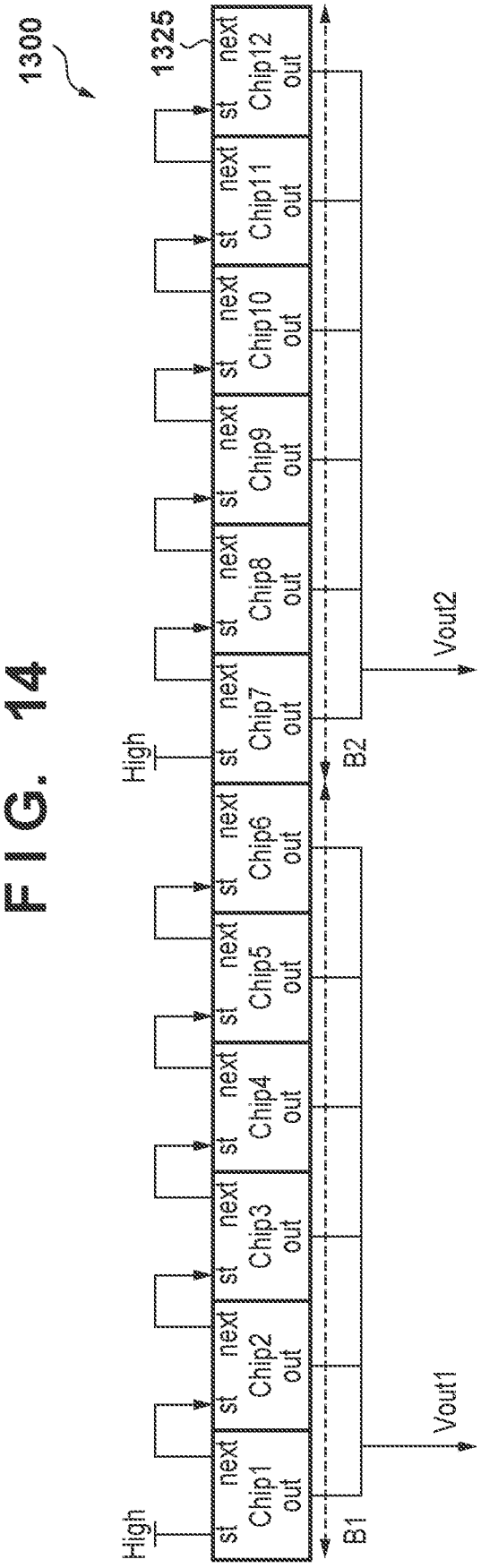
FIG. 14 is a view illustrating a configuration of connection of the image sensor ICs.

FIG. 14 is a view illustrating a configuration of connection of image sensor ICs in a substrate of the CIS 1300. Twelve image sensor ICs 1325 (hereinafter, referred to as Chip 1 to Chip 12) are arranged on a substrate so that light reflected from a reading target (original) of about 22.7 cm can be read at once. The read and generated analog image data is outputted from two output channels (Vout1, Vout2). In the operation of the image sensor ICs 1325, other than that the number of pixels differs from the image sensor ICs 312 is the same as the description in the first embodiment.

In FIG. 14, a region to be read by the Chip 1 to the Chip 6 is B1. The read analog image data of B1 is sequentially outputted from Vout1 among the output channels that the CIS 1300 has. Also, a region to be read by the Chip 7 to the Chip 12 is B2. The read analog image data of B2 is sequentially outputted from Vout2 among the output channels that the CIS 1300 has.

Figure 15:
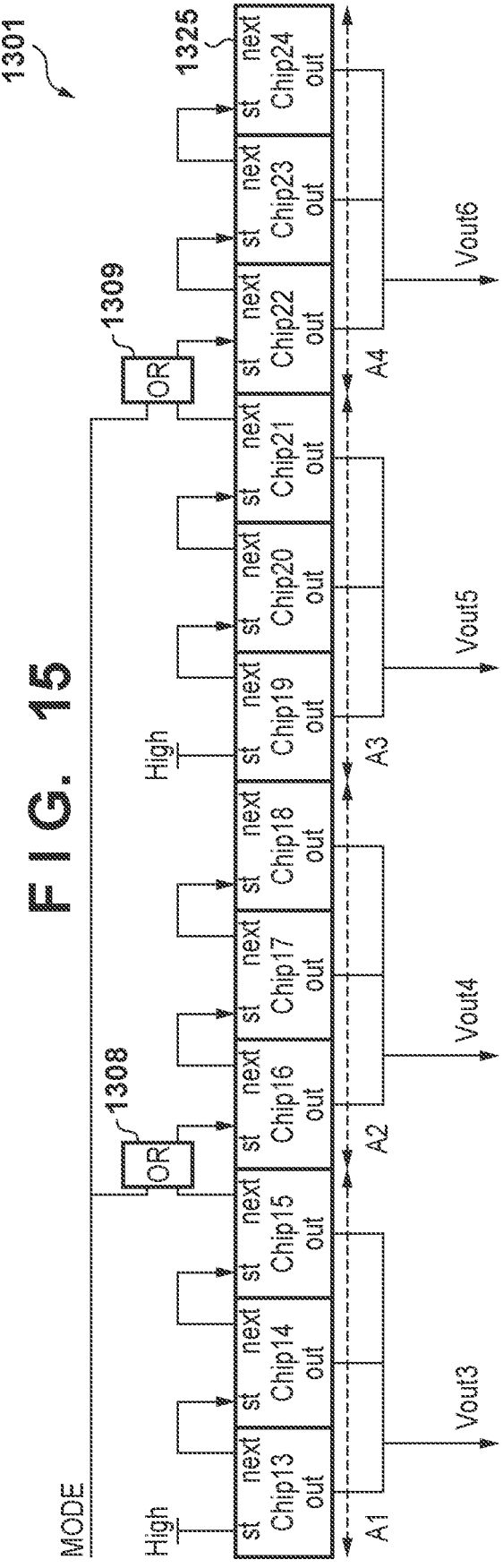
FIG. 15 is a view illustrating a configuration of connection of the image sensor ICs.

FIG. 15 is a view illustrating a configuration of connection of image sensor ICs for selectively switching the output timing of analog image data in a substrate of the CIS 1301. 12 image sensor ICs 1325 (hereinafter, referred to as Chip 13 to Chip 24) are arranged on a substrate so that light reflected from a reading target (original) of about 22.7 cm can be read at once. The read and generated analog image data is outputted from four output channels (Vout3 to Vout6).

In FIG. 15, a region to be read by the Chip 13 to the Chip 15 is A1. The read analog image data of A1 is sequentially outputted from Vout3 among the output channels that the CIS 1301 has. Also, a region to be read by the Chip 16 to the Chip 18 is A2. The read analog image data of A2 is sequentially outputted from Vout4 among the output channels that the CIS 1301 has. Also, a region to be read by the Chip 19 to the Chip 21 is A3. The read analog image data of A3 is sequentially outputted from Vout5 among the output channels that the CIS 1301 has. Assuming that the region to be read by the Chip 22 to the Chip 24 is A4, the read analog image data of A4 is sequentially outputted from Vout6 among the output channels that the CIS 1301 has.

On the substrate, OR gates 1308 and 1309 are configured as the output control unit 1322. The OR gate 1308 takes a MODE selection signal outputted from the timing signal generation unit 301 and a next signal outputted from the Chip 15 as inputs, and outputs a logical sum thereof. The outputted signal is inputted to the st terminal of the Chip 16. If MODE=High, High is inputted to the st terminal of the Chip 16. That is, the output of the pixels of the Chip 16 is started using the horizontal synchronization signal SH as a trigger. If MODE=Low, the output of the Chip 16 is started at the timing at which the next signal of the Chip 15 is inputted to the st terminal of the Chip 16, that is, after all pixels have been outputted from the Chip 15.

The OR gate 1309 takes a MODE selection signal outputted from the timing signal generation unit 301 and a next signal outputted from the Chip 21 as inputs, and outputs a logical sum thereof. The outputted signal is inputted to the st terminal of the Chip 22. If MODE=High, High is inputted to the st terminal of the Chip 22. That is, the output of the pixels of the Chip 22 is started using the horizontal synchronization signal SH as a trigger. If MODE=Low, the output of the pixels of the Chip 22 is started at the timing at which the next signal of the Chip 21 is inputted to the st terminal of the Chip 22, that is, after all pixels have been outputted from the Chip 21.

Figure 16:
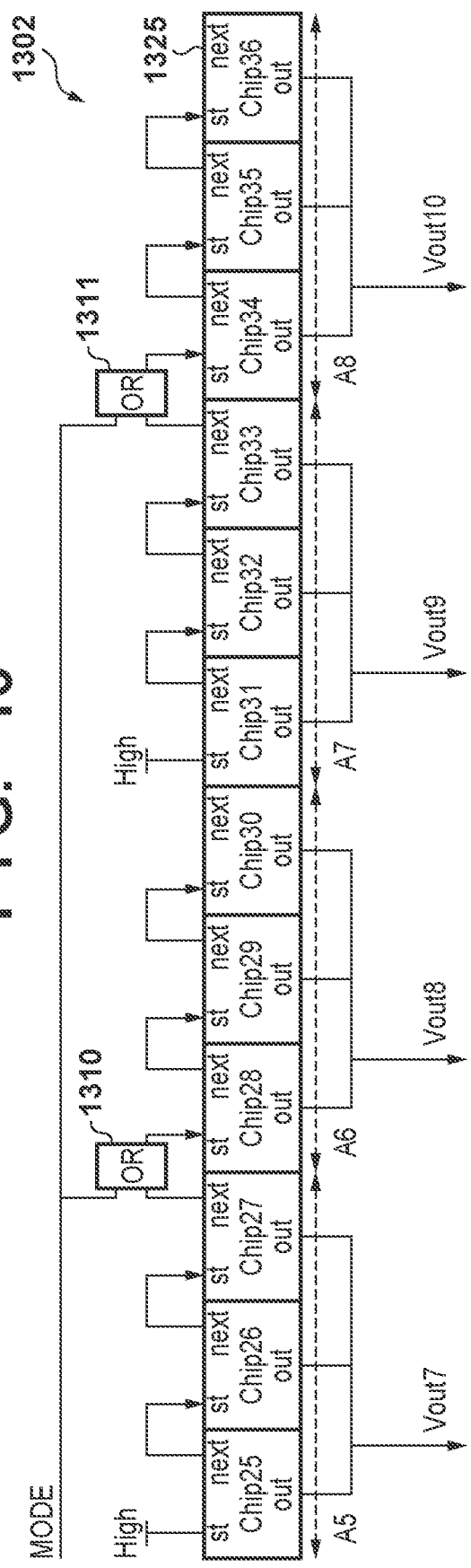
FIG. 16 is a view illustrating a configuration of connection of the image sensor ICs.

FIG. 16 is a view illustrating a configuration of connection of image sensor ICs for selectively switching the output timing of analog image data in a substrate of the CIS 1302. 12 image sensor ICs 1325 (hereinafter, referred to as Chip 25 to Chip 36) are arranged on a substrate so that light reflected from a reading target (original) of about 22.7 cm can be read at once. The read and generated analog image data is outputted from four output channels (Vout7 to Vout10).

In FIG. 16, a region to be read by the Chip 25 to the Chip 27 is A5. The read analog image data of A5 is sequentially outputted from Vout7 among the output channels that the CIS 1302 has. Also, a region to be read by the Chip 28 to the Chip 30 is A6. The read analog image data of A6 is sequentially outputted from Vout8 among the output channels that the CIS 1302 has. Also, a region to be read by the Chip 31 to the Chip 33 is A7. The read analog image data of A7 is sequentially outputted from Vout9 among the output channels that the CIS 1302 has. Also, a region to be read by the Chip 34 to the Chip 36 is A8. The read analog image data of A8 is sequentially outputted from Vout10 among the output channels that the CIS 1302 has.

On the substrate, OR gates 1310 and 1311 are configured as the output control unit 1323. The OR gate 1310 takes a MODE selection signal outputted from the timing signal generation unit 301 and a next signal outputted from the Chip 27 as inputs, and outputs a logical sum thereof. The outputted signal is inputted to the st terminal of the Chip 28. If MODE=High, High is inputted to the st terminal of the Chip 28. That is, the output of the pixels of the Chip 28 is started using the horizontal synchronization signal SH as a trigger. If MODE=Low, the output of the pixels of the Chip 28 is started at the timing at which the next signal of the Chip 27 is inputted to the st terminal of the Chip 28, that is, after all pixels have been outputted from the Chip 27.

The OR gate 1311 takes a MODE selection signal outputted from the timing signal generation unit 301 and a next signal outputted from the Chip 33 as inputs, and outputs a logical sum thereof. The outputted signal is inputted to the st terminal of the Chip 34. If MODE=High, High is inputted to the st terminal of the Chip 34. That is, the output of the pixels of the Chip 34 is started using the horizontal synchronization signal SH as a trigger. If MODE=Low, the output of the pixels of the Chip 34 is started at the timing at which the next signal of the Chip 33 is inputted to the st terminal of the Chip 34, that is, after all pixels have been outputted from the Chip 33.

Figure 17:
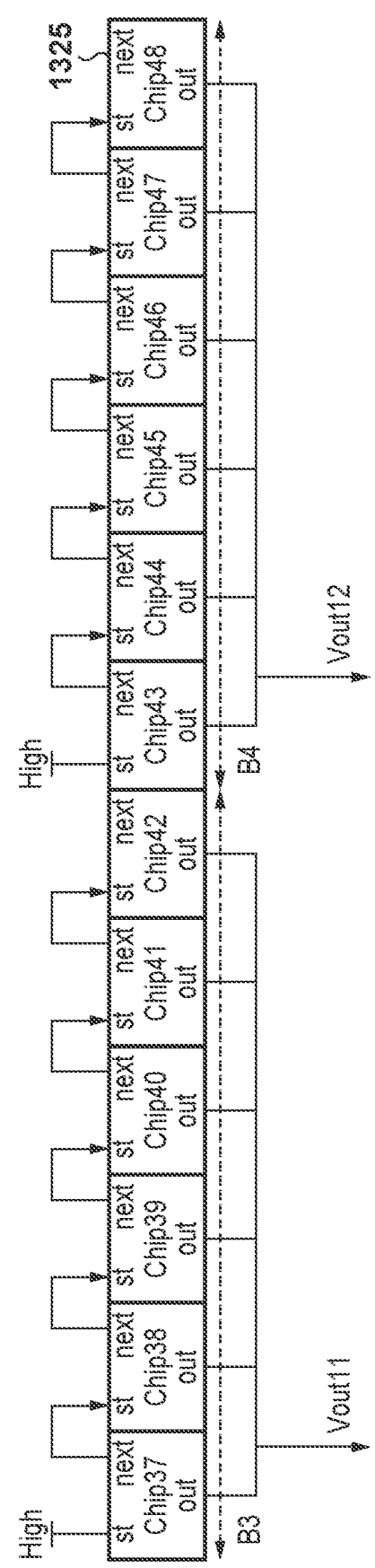
FIG. 17 is a view illustrating a configuration of connection of the image sensor ICs.

FIG. 17 is a view illustrating a configuration of connection of image sensor ICs in a substrate of the CIS 1303. Twelve image sensor ICs 1325 (hereinafter, referred to as Chip 37 to Chip 48) are arranged on a substrate so that light reflected from a reading target (original) of about 22.7 cm can be read at once. The read and generated analog image data is outputted from two output channels (Vout11, Vout12).

In FIG. 17, a region to be read by the Chip 37 to the Chip 42 is B3. The read analog image data of B3 is sequentially outputted from Vout11 among the output channels that the CIS 1303 has. Also, a region to be read by the Chip 43 to the Chip 48 is B4. The read analog image data of B4 is sequentially outputted from Vout12 among the output channels that the CIS 1303 has.

Note that the output control units 1322 and 1323 are not limited to OR gates. For example, instead of the OR gate 1308, a switch may be used such that when MODE=High, High is outputted, and when MODE=Low, a next signal of the Chip 15 is outputted.

[Operation of Each Reading Mode]

Figure 18:
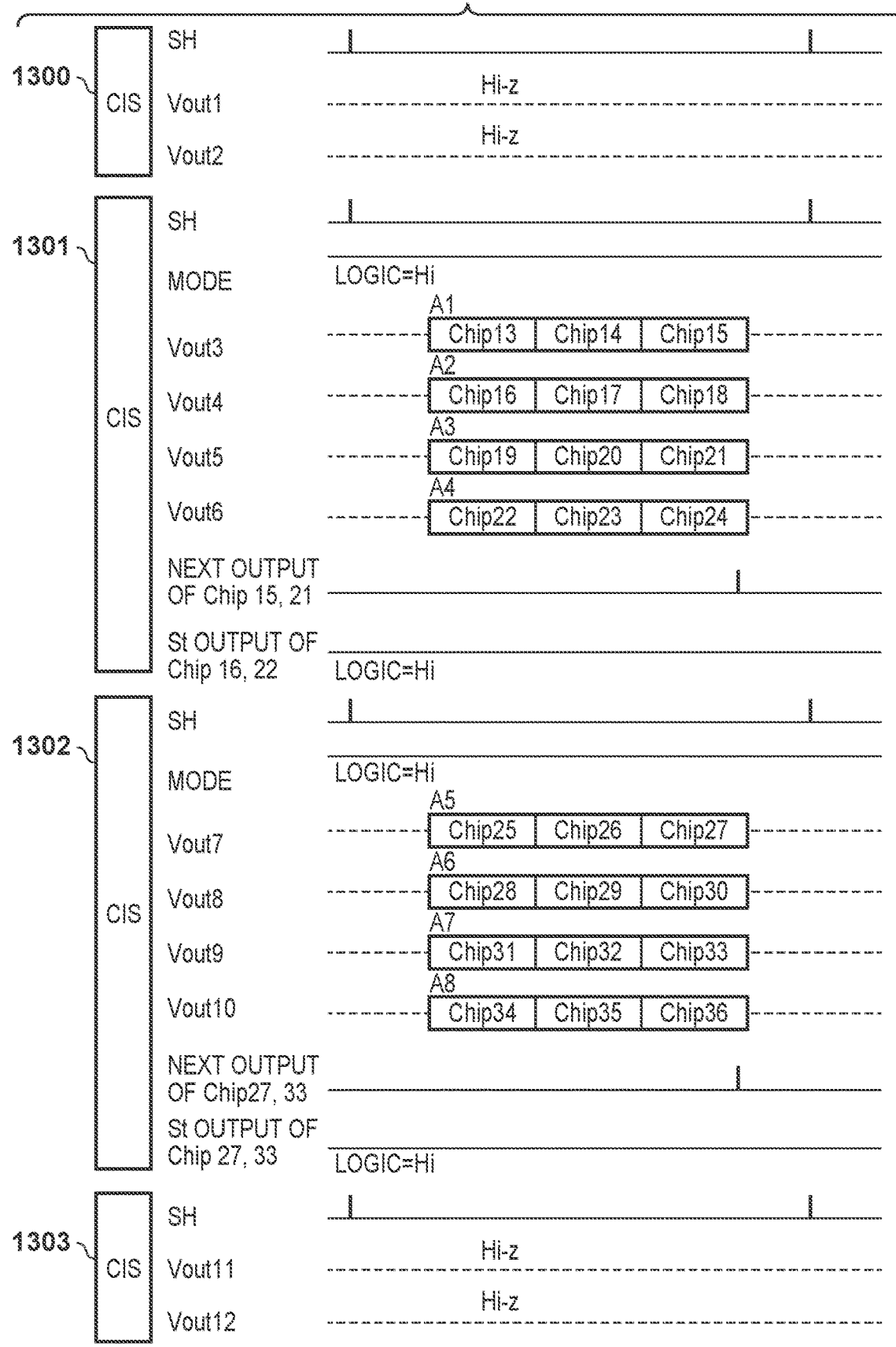
FIG. 18 is a view illustrating a timing chart in an A2-size reading mode.
Figure 19:
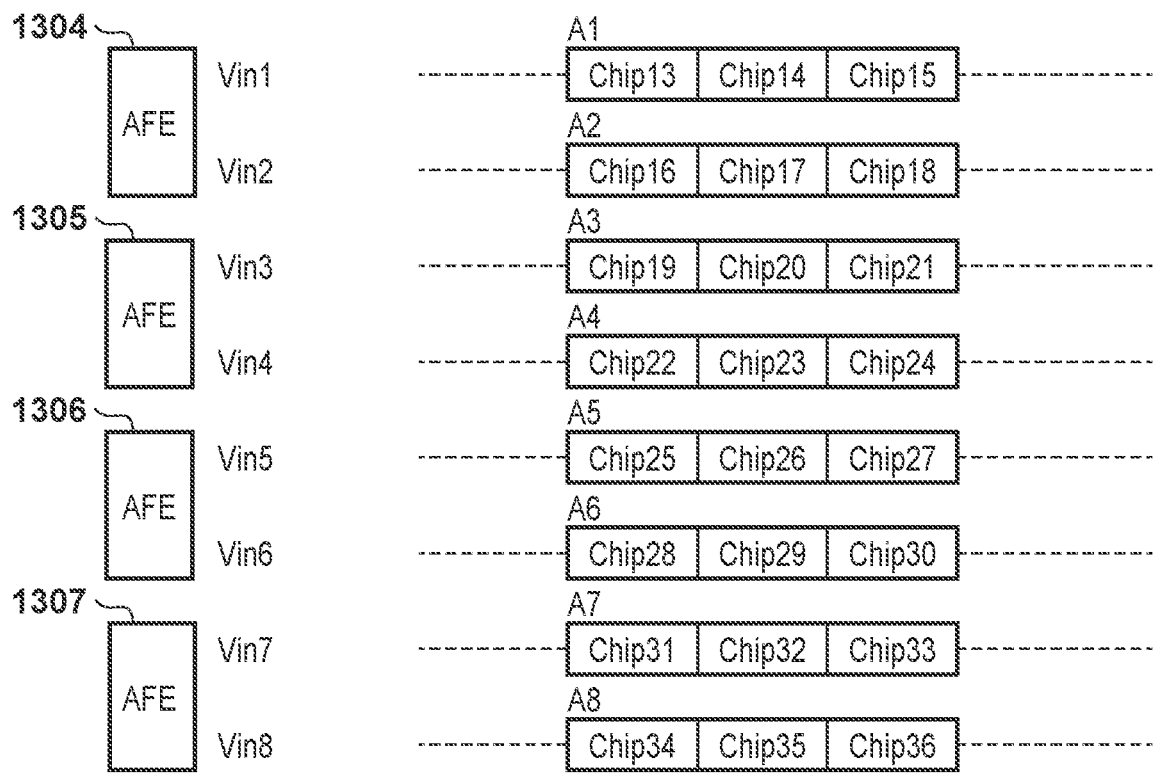
FIG. 19 is a view illustrating a timing chart in the A2-size reading mode.
Figure 20:
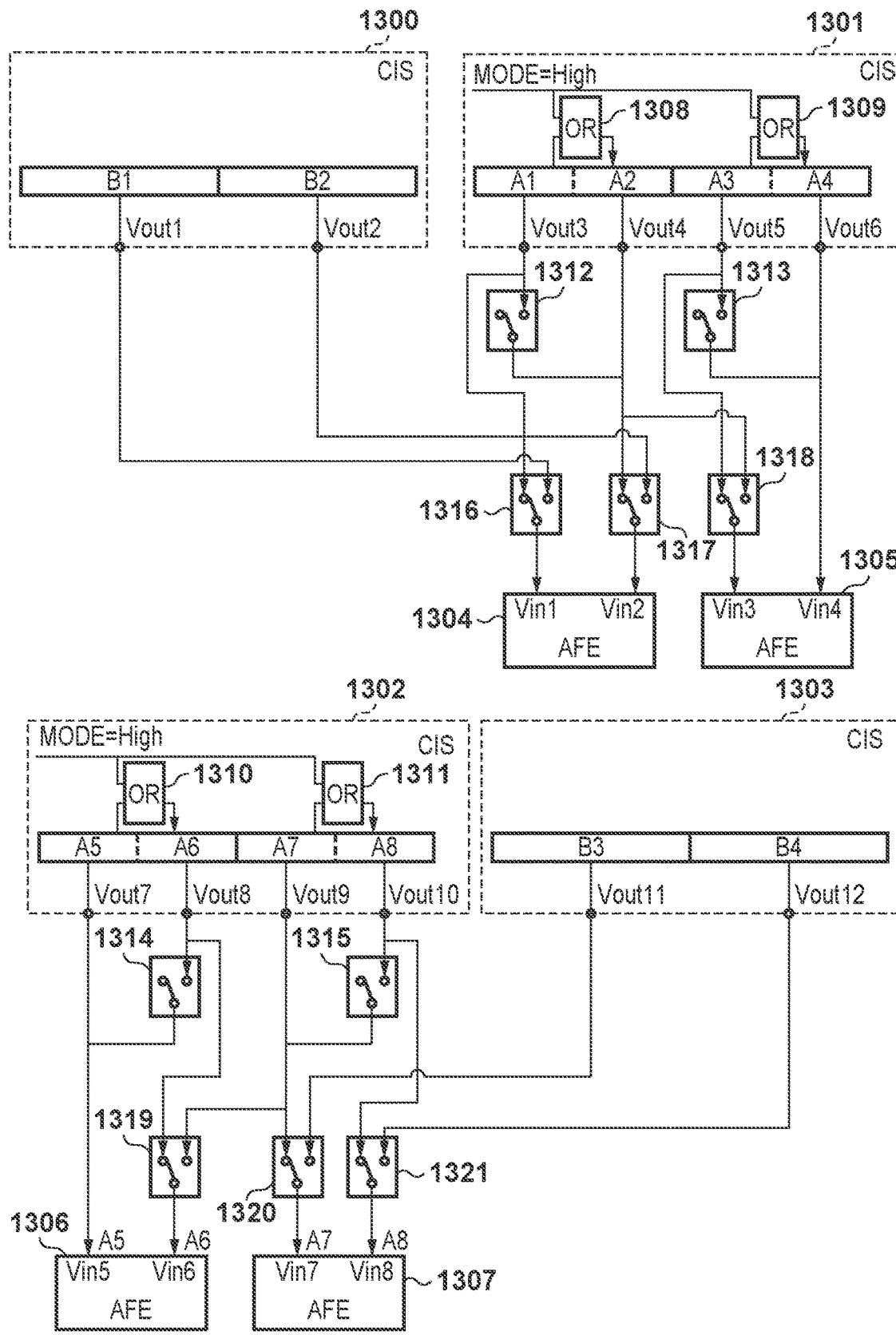
FIG. 20 is a view illustrating wire connections between CISs and AFEs in the A2-size reading mode.

The operation of the A2-size reading mode will be described. FIG. 18 is a view illustrating a timing chart of an analog image data output of the CIS 1300 to the CIS 1303 in the A2-size reading mode. FIG. 19 is a view illustrating a timing chart for inputting analog image data to the AFEs. FIG. 20 is a view illustrating wire connection in which the analog image data outputted from the CIS 1300 to the CIS 1303 in the A2-size reading mode is inputted to the AFE 1304 to the AFE 1307 via the switching gates 1312 to 1321. In FIG. 20, the configurations illustrated in FIGS. 14 to 17 have each been simplified for the CIS 1300 to the CIS 1303. The AFE 1304 has two input channels, which are Vin1 and Vin2, respectively. The AFE 1305 has two input channels, which are Vin3 and Vin4, respectively. The AFE 1306 has two input channels, which are Vin5 and Vin6, respectively. The AFE 1307 has two input channels, which are Vin7 and Vin8, respectively.

The output of analog image data of the CIS 1300 in the A2-size reading mode will be described. Since the CIS 1300 is not used in the A2-size reading mode, a control signal such as a horizontal synchronization signal SH from the timing signal generation unit 301 is not supplied to the CIS 1300. As a result, as illustrated in FIG. 18, the outputs of Vout1 and Vout2 become Hi-z.

The output of analog image data of the CIS 1301 in the A2-size reading mode will be described. In the A2-size reading mode, the timing signal generation unit 301 outputs a MODE selection signal fixed at High. When the horizontal synchronization signal SH is inputted, the output of analog image data of the Chip 13 and the Chip 19 whose st terminals are fixed to High is started. Meanwhile, since High is inputted to the st terminals of the Chip 16 and the Chip 22 by the respective outputs of the OR gates 1308 and 1309, the output of analog image data of the Chip 16 and the Chip 22 are started. When the output of analog image data is completed, the next signals of the Chip 13, the Chip 16, the Chip 19, and the Chip 22 are inputted to the st terminals of the Chip 14, the Chip 17, the Chip 20, and the Chip 23, respectively. Then, the output of analog image data of the Chip 14, the Chip 17, the Chip 20, and the Chip 23 is started. When the output of analog image data is completed, the next signals of the Chip 14, the Chip 17, the Chip 20, and the Chip 23 are inputted to the st terminals of the Chip 15, the Chip 18, the Chip 21, and the Chip 24, respectively. Then, the output of analog image data of the Chip 15, the Chip 18, the Chip 21, and the Chip 24 is started. When the output of analog image data is completed, the next signals of the Chip 15, the Chip 18, the Chip 21, and the Chip 24 are outputted (connection destinations are open circuits), and Vout3 to Vout6 become Hi-z. Vout3 to Vout6 of FIG. 18 indicate the above outputs of analog image data.

The output of analog image data of the CIS 1302 in the A2-size reading mode will be described. In the A2-size reading mode, the timing signal generation unit 301 outputs a MODE selection signal fixed at High. When the horizontal synchronization signal SH is inputted, the output of analog image data of the Chip 25 and the Chip 31 whose st terminals are fixed to High is started. Meanwhile, since High is inputted to the st terminals of the Chip 28 and the Chip 34 by the respective outputs of the OR gates 1310 and 1311, the output of analog image data of the Chip 28 and the Chip 34 are started. When the output of analog image data is completed, the next signals of the Chip 25, the Chip 28, the Chip 31, and the Chip 34 are inputted to the st terminals of the Chip 26, the Chip 29, the Chip 32, and the Chip 35, respectively. Then, the output of analog image data of the Chip 26, the Chip 29, the Chip 32, and the Chip 35 is started. When the output of analog image data is completed, the next signals of the Chip 26, the Chip 29, the Chip 32, and the Chip 35 are inputted to the st terminals of the Chip 27, the Chip 30, the Chip 33, and the Chip 36, respectively. Then, the output of analog image data of the Chip 27, the Chip 30, the Chip 33, and the Chip 36 is started. When the output of analog image data is completed, the next signals of the Chip 27, the Chip 30, the Chip 33, and the Chip 36 are outputted (connection destinations are open circuits), and Vout7 to Vout10 become Hi-z. Vout7 to Vout10 of FIG. 18 indicate the above outputs of analog image data.

The output of analog image data of the CIS 1303 in the A2-size reading mode will be described. Since the CIS 1303 is not used in the A2-size reading mode, a control signal such as a horizontal synchronization signal SH from the timing signal generation unit 301 is not supplied to the CIS 1303. As a result, as illustrated in FIG. 18, the outputs of Vout11 and Vout12 become Hi-z.

Note that channels (Vout4, Vout6, Vout8, Vout10) whose output timings are switched by the output control units 1322 and 1323 are referred to as variable channels, and others are referred to as fixed channels.

The input of analog image data to the AFE 1304 and the AFE 1307 in the A2-size reading mode will be described. Analog image data outputted from the CIS 1300 and the CIS 1303 is inputted to the AFE 1304 to the AFE 1307 via switching gates 1312 to 1321. Each of the switching gates 1312 to 1321 has two input terminals, and selects a signal to be outputted by a MODE selection signal outputted from the timing signal generation unit 301. Vin1 of the AFE 1304 takes only the analog image data of the A1 region as input by the analog image data of the A1 region being allowed to pass by the switching gate 1316. Vin2 of the AFE 1304 takes the analog image data of the A2 region as input when the switching gate 1312 blocks the analog image data of the A1 region, and only the analog image data of the A2 region is allowed to pass by the switching gate 1317.

Vin3 of the AFE 1305 takes only the analog image data of the A3 region as input when the analog image data of the A3 region to allowed to pass by the switching gate 1318. Vin4 of the AFE 1305 takes only the analog image data of the A4 region as input when the switching gate 1313 blocks the analog image data of the A3 region.

Vin5 of the AFE 1306 takes only the analog image data of the A5 region as input when the switching gate 1314 blocks the analog image data of the A6 region. Vin6 of the AFE 1306 takes only the analog image data of the A6 region as input by the analog image data of the A6 region being allowed to pass by the switching gate 1319.

Vin7 of the AFE 1307 takes the analog image data of the A7 region as input when the switching gate 1315 blocks the analog image data of the A8 region, and only the analog image data of the A7 region is allowed to pass by the switching gate 1320. Vin8 of the AFE 1307 takes only the analog image data of the A8 region as input when the analog image data of the A8 region is allowed to pass by the switching gate 1321.

Figure 21:
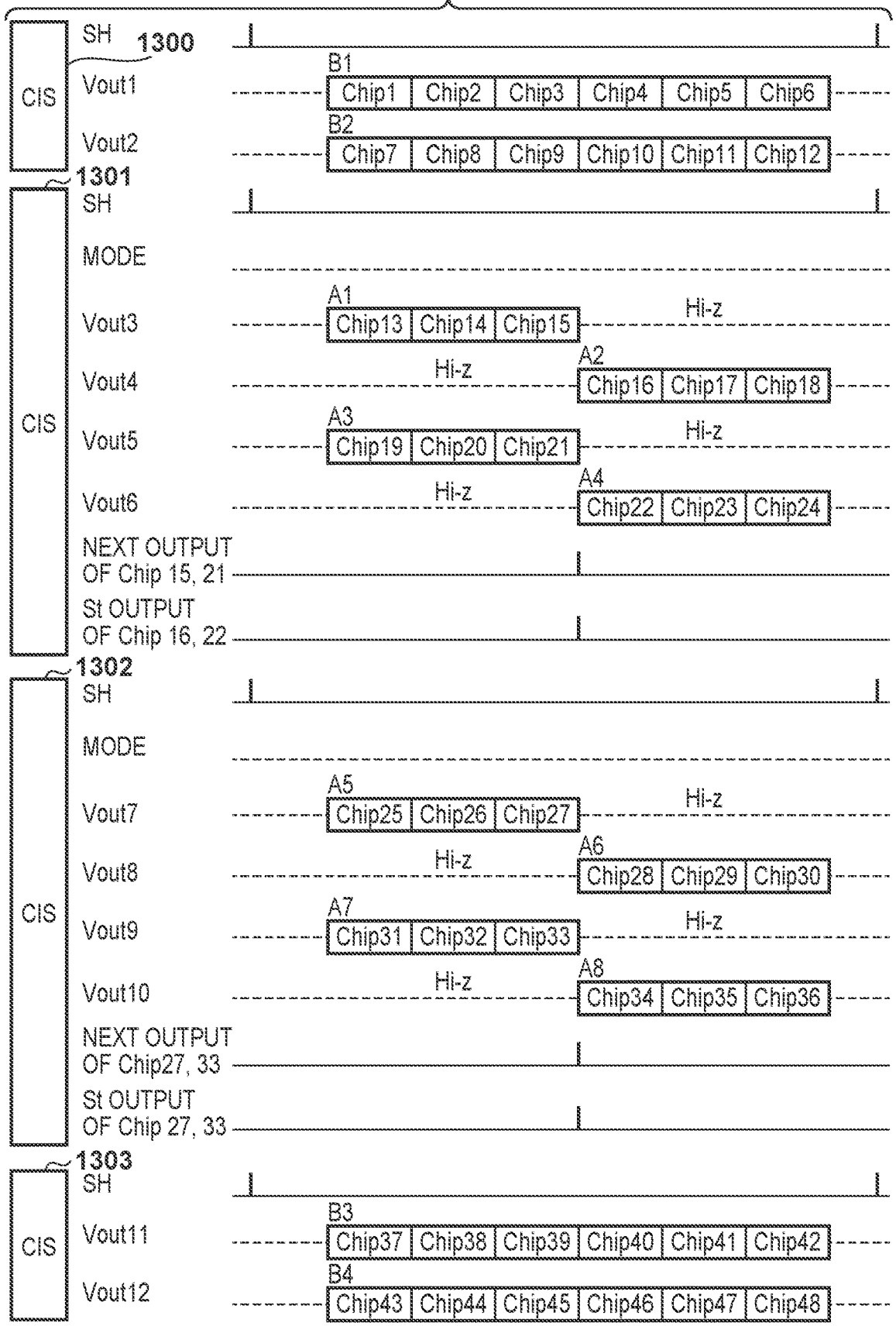
FIG. 21 is a view illustrating a timing chart in an A0-size reading mode.
Figure 22:
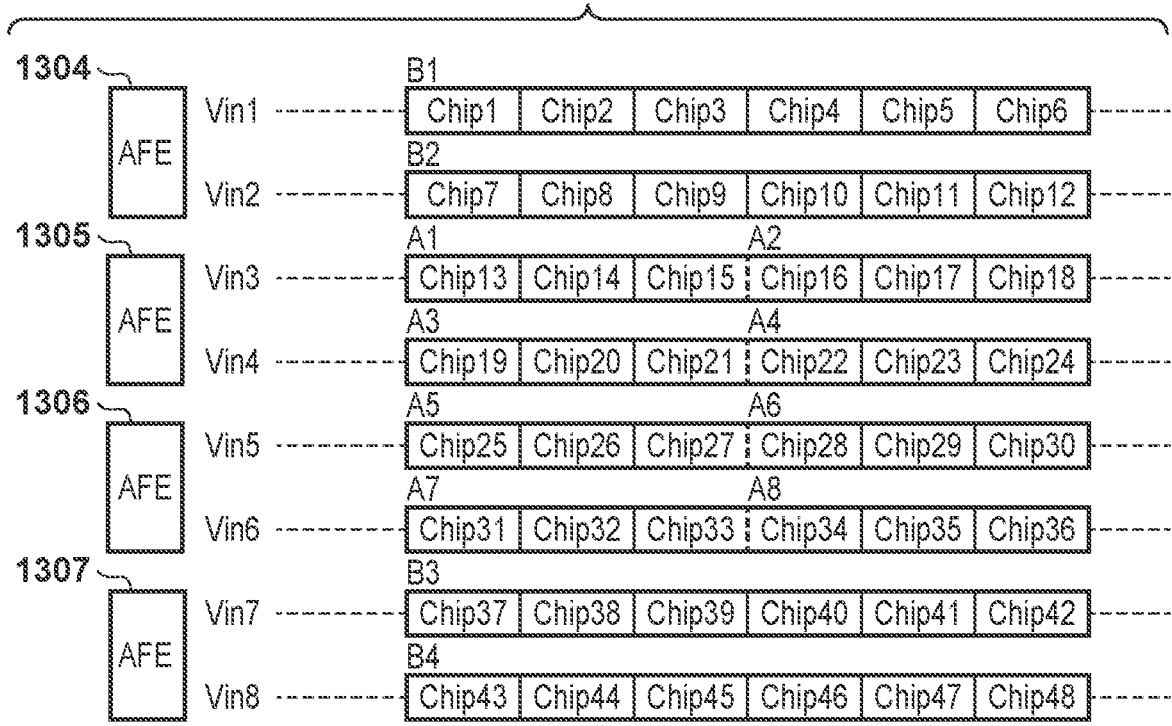
FIG. 22 is a view illustrating a timing chart in the A0-size reading mode.
Figure 23A:
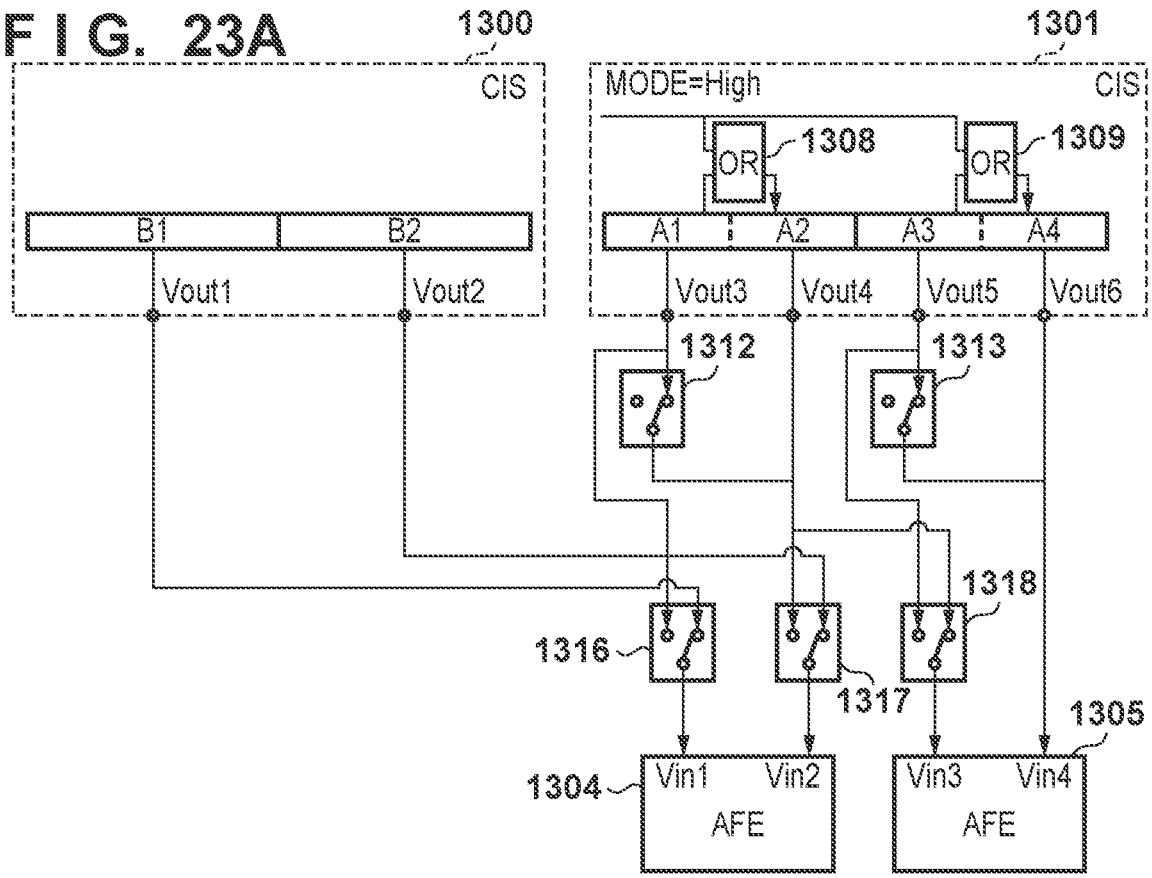
FIGS. 23A and 23B are views illustrating wire connections between CISs and AFEs in the A0-size reading mode.
Figure 23B:
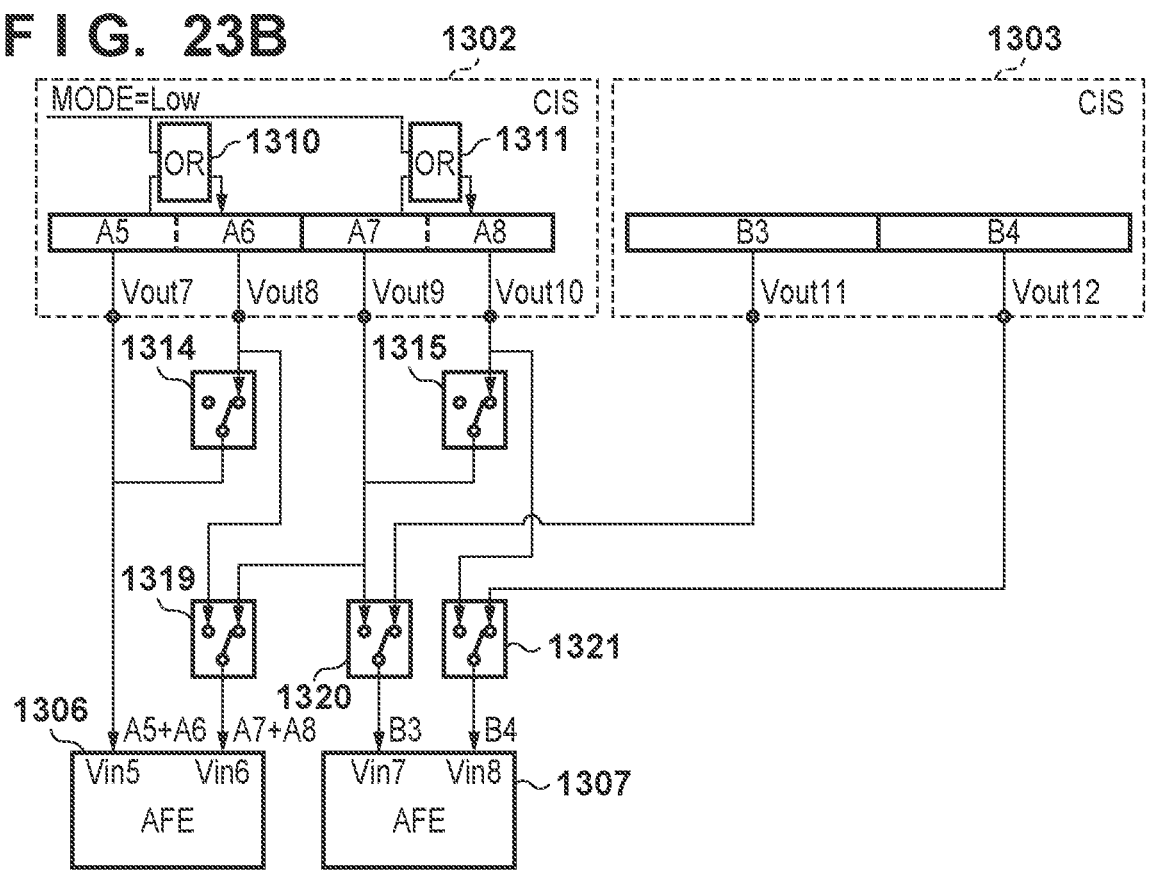

Next, the operation of the A0-size reading mode will be described. FIG. 21 is a view illustrating a timing chart of an analog image data output of the CIS 1300 to the CIS 1303 in the A0-size reading mode. FIG. 22 is a view illustrating a timing chart for inputting analog image data to the AFEs. FIGS. 23A and 23B are views illustrating wire connection in which the analog image data outputted from the CIS 1300 to the CIS 1303 in the A0-size reading mode is inputted to the AFE 1304 to the AFE 1307 via the switching gates 1312 to 1321. In FIGS. 23A and 23B, the configurations illustrated in FIGS. 14 to 17 have each been simplified for the CIS 1300 to the CIS 1303. The AFE 1304 has two input channels, which are Vin1 and Vin2, respectively. The AFE 1305 has two input channels, which are Vin3 and Vin4, respectively. The AFE 1306 has two input channels, which are Vin5 and Vin6, respectively. The AFE 1307 has two input channels, which are Vin7 and Vin8, respectively.

The output of analog image data of the CIS 1300 in the A0-size reading mode will be described. When the horizontal synchronization signal SH is inputted, the output of analog image data of the Chip 1 and the Chip 7 whose st terminals are fixed to High is started. When the output of analog image data is completed, the next signals of the Chip 1 and the Chip 7 are inputted to the st terminals of the Chip 2 and the Chip 8, respectively, and the output of analog image data of the Chip 2 and the Chip 8 is started. When the output of analog image data is completed, the next signals of the Chip 2 and the Chip 8 are inputted to the st terminals of the Chip 3 and the Chip 9, respectively, and the output of analog image data of the Chip 3 and the Chip 9 is started. When the output of analog image data is completed, the next signals of the Chip 3 and the Chip 9 are inputted to the st terminals of the Chip 4 and the Chip 10, respectively, and the output of analog image data of the Chip 4 and the Chip 10 is started. When the output of analog image data is completed, the next signals of the Chip 4 and the Chip 10 are inputted to the st terminals of the Chip 5 and the Chip 11, respectively, and the output of analog image data of the Chip 5 and the Chip 11 is started. When the output of analog image data is completed, the next signals of the Chip 5 and the Chip 11 are inputted to the st terminals of the Chip 6 and the Chip 12, respectively, and the output of analog image data of the Chip 6 and the Chip 12 is started. When the output of analog image data is completed, the next signals of the Chip 6 and the Chip 12 are outputted (connection destinations are open circuits), and Vout1 and Vout2 become Hi-z. Vout1 to Vout2 of FIG. 21 indicate the above outputs of analog image data.

The output of analog image data of the CIS 1301 in the A0-size reading mode will be described. In the A0-size reading mode, the timing signal generation unit 301 outputs a MODE selection signal fixed at Low. When the horizontal synchronization signal SH is inputted, the output of analog image data of the Chip 13 and the Chip 19 whose st terminals are fixed to High is started. Note that, the next signals of the Chip 15 and the Chip 21 are respectively inputted to the st terminals of the Chip 16 and the Chip 22 by the respective outputs of the OR gates 1308 and 1309. Therefore, the output is not started at this point in time, and Vout4 and Vout6 become Hi-z as illustrated in FIG. 21. When the output of analog image data is completed, the next signals of the Chip 13 and the Chip 19 are inputted to the st terminals of the Chip 14 and the Chip 20, respectively, and the output of analog image data of the Chip 14 and the Chip 20 is started. When the output of analog image data is completed, the next signals of the Chip 14 and the Chip 20 are inputted to the st terminals of the Chip 15 and the Chip 21, respectively, and the output of analog image data of the Chip 15 and the Chip 21 is started. When the output of analog image data is completed, Vout3 and Vout5 become Hi-z, and the next signals of the Chip 15 and the Chip 21 are inputted to the st terminals of the Chip 16 and the Chip 22 via the OR gates 1308 and 1309, respectively. Then, the output of analog image data of the Chip 16 and the Chip 22 is started. That is, the output will be transmitted on the signal line, where the output start timings of the Chip 16 and the Chip 22 (in other words, the output start timings of Vout4 and Vout6) are delayed by three chips with respect to the A2-size reading. When the output of analog image data is completed, the next signals of the Chip 16 and the Chip 22 are inputted to the st terminals of the Chip 17 and the Chip 23, respectively, and the output of analog image data of the Chip 17 and the Chip 23 is started. When the output of analog image data is completed, the next signals of the Chip 17 and the Chip 23 are inputted to the st terminals of the Chip 18 and the Chip 24, respectively, and the output of analog image data of the Chip 18 and the Chip 24 is started. When the output of analog image data is completed, the next signals of the Chip 18 and the Chip 24 are outputted (connection destinations are open circuits), and Vout4 and Vout6 become Hi-z. Vout3 to Vout6 of FIG. 21 indicate the above outputs of analog image data.

The output of analog image data of the CIS 1302 in the A0-size reading mode will be described. In the A0-size reading mode, the timing signal generation unit 301 outputs a MODE selection signal fixed at Low. When the horizontal synchronization signal SH is inputted, the output of analog image data of the Chip 25 and the Chip 31 whose st terminals are fixed to High is started. Note that, the next signals of the Chip 27 and the Chip 33 are respectively inputted to the st terminals of the Chip 28 and the Chip 34 by the respective outputs of the OR gates 1310 and 1311. Therefore, the output is not started at this point in time, and Vout8 and Vout10 become Hi-z as illustrated in FIG. 21. When the output of analog image data is completed, the next signals of the Chip 25 and the Chip 31 are inputted to the st terminals of the Chip 26 and the Chip 32, respectively, and the output of analog image data of the Chip 26 and the Chip 32 is started. When the output of analog image data is completed, the next signals of the Chip 26 and the Chip 32 are inputted to the st terminals of the Chip 27 and the Chip 33, respectively, and the output of analog image data of the Chip 27 and the Chip 33 is started. When the output of analog image data is completed, Vout7 and Vout9 become Hi-z, and the next signals of the Chip 27 and the Chip 33 are inputted to the st terminals of the Chip 28 and the Chip 34 via the OR gates 1310 and 1311, respectively. Then, the output of analog image data of the Chip 28 and the Chip 34 is started. That is, the output start timings of the Chip 28 and the Chip 34 (in other words, the output start timings of Vout8 and Vout10) are delayed by three chips with respect to the A2-size reading. When the output of analog image data is completed, the next signals of the Chip 28 and the Chip 34 are inputted to the st terminals of the Chip 29 and the Chip 35, respectively, and the output of analog image data of the Chip 29 and the Chip 35 is started. When the output of analog image data is completed, the next signals of the Chip 29 and the Chip 35 are inputted to the st terminals of the Chip 30 and the Chip 36, respectively, and the output of analog image data of the Chip 30 and the Chip 36 is started. When the output of analog image data is completed, the next signals of the Chip 30 and the Chip 36 are outputted (connection destinations are open circuits), and Vout8 and Vout10 become Hi-z. Vout7 to Vout10 of FIG. 21 indicate the above outputs of analog image data.

The output of analog image data of the CIS 1303 in the A0-size reading mode will be described. When the horizontal synchronization signal SH is inputted, the output of analog image data of the Chip 37 and the Chip 43 whose st terminals are fixed to High is started. When the output of analog image data is completed, the next signals of the Chip 37 and the Chip 43 are inputted to the st terminals of the Chip 38 and the Chip 44, respectively, and the output of analog image data of the Chip 38 and the Chip 44 is started. When the output of analog image data is completed, the next signals of the Chip 38 and the Chip 44 are inputted to the st terminals of the Chip 39 and the Chip 45, respectively, and the output of analog image data of the Chip 39 and the Chip 45 is started. When the output of analog image data is completed, the next signals of the Chip 39 and the Chip 45 are inputted to the st terminals of the Chip 40 and the Chip 46, respectively, and the output of analog image data of the Chip 40 and the Chip 46 is started. When the output of analog image data is completed, the next signals of the Chip 40 and the Chip 46 are inputted to the st terminals of the Chip 41 and the Chip 47, respectively, and the output of analog image data of the Chip 41 and the Chip 47 is started. When the output of analog image data is completed, the next signals of the Chip 41 and the Chip 47 are inputted to the st terminals of the Chip 42 and the Chip 48, respectively, and the output of analog image data of the Chip 42 and the Chip 48 is started. When the output of analog image data is completed, the next signals of the Chip 42 and the Chip 48 are outputted (connection destinations are open circuits), and Vout7 and Vout8 become Hi-z. Vout11 to Vout12 of FIG. 21 indicate the above outputs of analog image data.

The input of analog image data to the AFE 1 to AFE 4 in the A0-size reading mode will be described.

Vin1 of the AFE 1304 takes only the analog image data of the B1 region as input when the analog image data of the B1 region is allowed to pass by the switching gate 1316. Vin2 of the AFE 1304 takes only the analog image data of the B2 region as input when the analog image data of the B2 region is allowed to pass by the switching gate 1317.

Regarding Vin3 of the AFE 1305, the analog image data of the A1 region and the analog image data of the A2 region are configured to be in a wired-OR by the analog image data of the A1 region being allowed to pass by the switching gate 1312. Then, Vin3 of the AFE 1305 takes the analog image data of the A1 region and the A2 region as input in time series by the wired-ORed analog image data being allowed to pass by the switching gate 1318. Regarding Vin4 of the AFE 1305, the analog image data of the A3 region and the analog image data of the A4 region are wired-ORed by the analog image data of the A3 region being allowed to pass by the switching gate 1313. Then, Vin4 of AFE 1305 takes the analog image data of the A3 region and the A4 region as inputs in time series.

Regarding Vin5 of the AFE 1306, the analog image data of the A6 region and the analog image data of the A5 region are wired-ORed by the analog image data of the A6 region being allowed to pass by the switching gate 1314. Then, Vin5 of AFE 1306 takes the analog image data of the A5 region and the A6 region as inputs in time series. Regarding Vin6 of the AFE 1306, the analog image data of the A7 region and the analog image data of the A8 region are configured to be in a wired-OR by the analog image data of the A8 region being allowed to pass by the switching gate 1315. Then, Vin6 of the AFE 1306 takes the analog image data of the A7 region and the A8 region as input in time series by the wired-ORed analog image data being allowed to pass by the switching gate 1319.

Vin7 of the AFE 1307 takes only the analog image data of the B3 region as input by the analog image data of the B3 region being allowed to pass by the switching gate 1320. Vin8 of the AFE 1307 takes only the analog image data of the B4 region as input by the analog image data of the B4 region being allowed to pass by the switching gate 1321.

Further, in the present embodiment, the switching gates 1312 and 1313 may be arranged on the CIS substrate of the CIS 1301, and the switching gates 1314 and 1315 may be arranged on the CIS substrate of the CIS 1302. Note that although the switching gates 1312 to 1315 use a switch with two inputs and one output, it may be a switch with one input and one output. Further, the CIS 1300 and the CIS 1303 have two output channels for analog image data, but may be configured to have four output channels for analog image data as in the CIS 1301 or the CIS 1302, and be able to switch output timings.

[Operation Flow]

Figure 24:
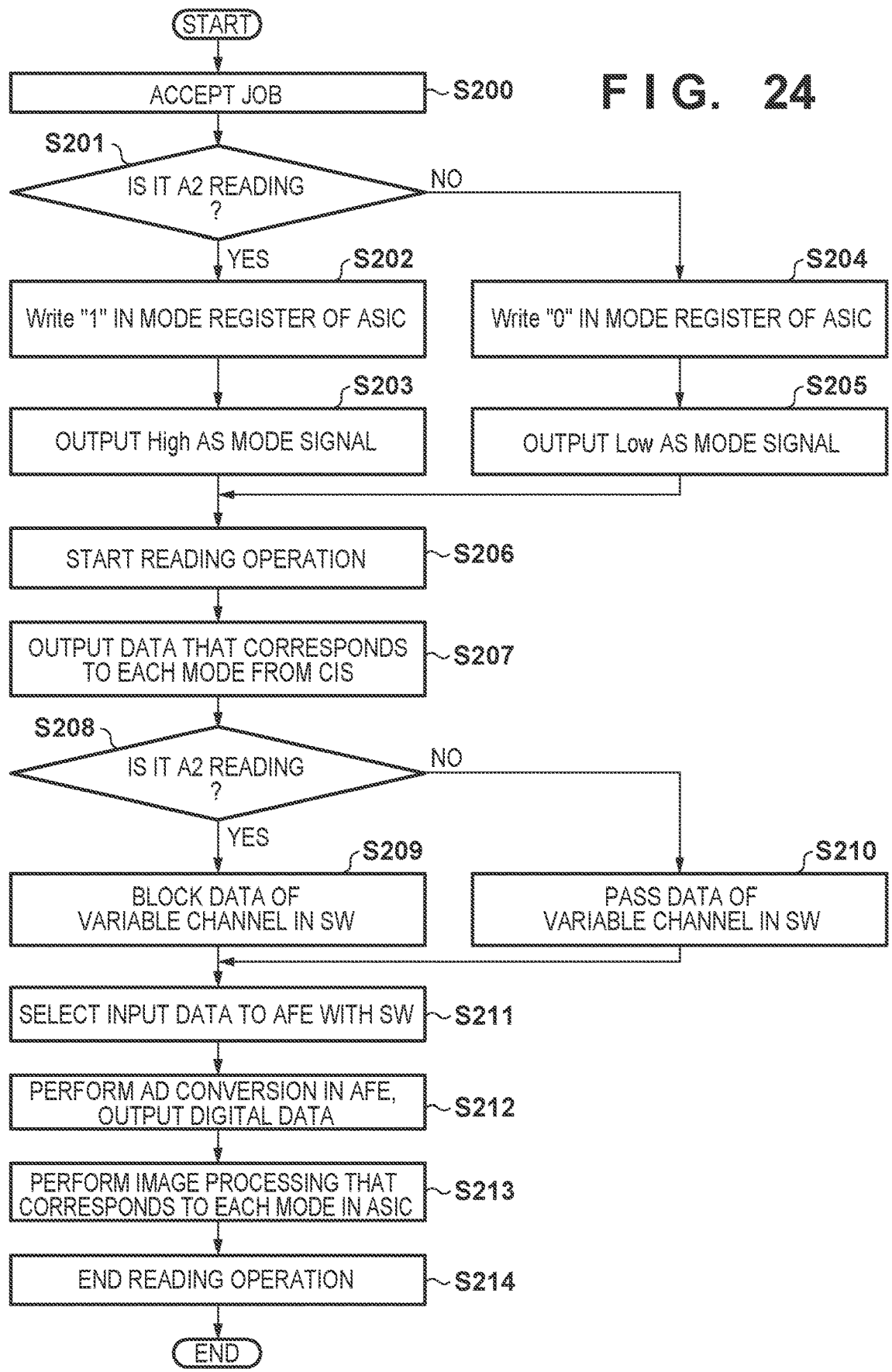
FIG. 24 is a flowchart illustrating a scan operation of the image reading apparatus.

FIG. 24 is a flowchart illustrating a scan operation of the image reading apparatus 100 in the present embodiment. The processing of FIG. 24 is realized, for example, by the CPU 511 reading the programs stored in the ROM 512 to the DRAM 513 and executing it. In step S200, the CPU 511 accepts a job regarding the size of an original to be read, which was inputted by the user via the operation unit 104 of the image reading apparatus 100 or the external apparatus 520. The job here may include copying of a scanned image. In step S201, the CPU 511 determines, based on the accepted job, which reading mode of the A2-size reading and the A0-size reading is selected. If it is determined that A2-size reading is selected (YES in step S201), the processing proceeds to step S202, and if it is determined that A0-size reading is selected (NO in step S201), the processing proceeds to step S204.

If it is determined that A2-size reading is selected, the CPU 511, in step S202, writes "1" to the mode register (not illustrated) of the ASIC 510. In step S203, the ASIC 510 outputs High as the MODE selection signal based on the setting of the mode register and, in step S206, starts the reading operation. Meanwhile, if it is determined that A0-size reading is selected, the CPU 511, in step S204, writes "0" to the mode register (not illustrated) of the ASIC 510. In step S205, the ASIC 510 outputs Low as the MODE selection signal based on the setting of the mode register of the ASIC 510 and, in step S206, starts the reading operation.

In step S207, the CIS 1300, the CIS 1301, the CIS 1302, and the CIS 1303 output the analog image data corresponding to the respective reading modes in accordance with the set signal, and the processing proceeds to step S208. Note that the output in step S207 is executed as described in FIGS. 18 and 21.

In step S208, the CPU 511 determines, based on the accepted job, which reading mode of the A2-size reading and the A0-size reading is selected. When it is determined that A2-size reading is selected (YES in step S208), the MODE selection signal is inputted to the switching gates 1312 to 1321 as High in step S209. As a result of that, as illustrated in FIG. 20, the analog image data of the fixed channels Vout3 and Vout5 is blocked at the switching gates 1312 and 1313. Then, the analog image data of the variable channels Vout8 and Vout10 is blocked at the switching gates 1314 and 1315, and the processing proceeds to step S211. Meanwhile, when it is determined that A2-size reading is not selected (NO in step S208), the MODE selection signal is inputted to the switching gates 1312 to 1321 as Low in step S210. As a result of that, as illustrated in FIGS. 23A and 23B, the analog image data of the fixed channels Vout3 and Vout5 respectively passes through the switching gates 1312 and 1313. Then, the analog image data of the variable channels Vout8 and Vout10 respectively passes through the switching gates 1314 and 1315, and the processing proceeds to step S211.

In step S211, the switching gates 1316 to 1321 select analog image data to be inputted to the AFE 1304 and the AFE 1307 in accordance with the input value of the MODE selection signal inputted to the switching gates 1316 to 1321. Then, the analog image data is inputted to the AFE 1304 to the AFE 1307, and the processing proceeds to step S212. Note that in steps 209 to S211, operations as described in FIGS. 18 to 23B are performed.

In step S212, the CPU 511 converts analog image data outputted from the CIS 1300 to 1303 into digital image data. In step S213, the ASIC 510 performs image processing corresponding to the respective reading modes using the digital image data converted in step S212, and ends the reading operation in step S214. Thereafter, the processing of FIG. 24 ends.

As described above, even when the image sensor ICs having no dedicated switching function are used in the image reading apparatus 100 that supports reading of large-format originals, the output channels of the CISs can be assigned to all the input channels that the AFEs have. As a result, the analog image data outputted from the respective output channels of the CISs can be inputted to the input channels of the AFEs in parallel. Then, as illustrated in FIG. 18, FIG. 19, FIG. 21, and FIG. 22, the reading speed at the time of reading an original of a size (e.g., A2 size) narrower than the read width (e.g., A0 size) of the CISs can be increased in comparison to the reading of an original of a larger size.

Note that in the present embodiment, two CISs of four channels and two CISs of two channels are configured, but the present invention is not limited thereto. For example, the number of CISs and the number of channels may be changed in accordance with the size and the like of a sheet that can be handled by the image reading apparatus 100.

The present invention is not limited to the embodiments described above, and various modifications and variations are possible without departing from the spirit and scope of the invention. Accordingly, the claims are appended hereto in order to make the scope of the invention public.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-163884, filed Sep. 29, 2020, which is hereby incorporated by reference herein in its entirety.

What is claimed is:

1. An image reading apparatus comprising:
   a first reading unit configured to output an analog signal by reading an original;
   a second reading unit different from the first reading unit;
   a conversion unit configured to convert analog signals outputted from the first reading unit and from the second reading unit to digital signals;
   a wire connection control unit configured to control a wire connection between the first reading unit and the second reading unit and the conversion unit, by a switch that is provided on a signal line and switches an output target in a plurality of input signals, wherein the analog signals outputted from the first reading unit and from the second reading unit are inputted into the conversion unit via the wire connection control unit;
   an output control unit configured to control an output of an analog signal from the first reading unit,
   wherein, in a first reading mode, the wire connection control unit is configured to control the wire connection such that analog signals outputted from a plurality of output channels of the first reading unit are respectively inputted to a plurality of input channels of the conversion unit,
   in a second reading mode different from the first reading mode, the wire connection control unit is configured to control the wire connection such that the analog signals outputted from the plurality of output channels of the first reading unit and analog signals outputted from a plurality of output channels of the second reading unit are inputted to the plurality of input channels of the conversion unit, and
   in the second reading mode, the output control unit is configured to control an output of analog signals such that a timing of an output of an analog signal from each of the plurality of output channels of the first reading unit to be inputted to one input channel of the conversion unit is shifted.

2. The image reading apparatus according to claim 1, wherein the wire connection control unit is configured to perform a switchover of the switch using a signal that indicates either the first reading mode or the second reading mode.

3. The image reading apparatus according to claim 1, wherein an analog signal controlled by the output control unit in the second reading mode is transmitted on a signal line connected by a wired-OR to one input channel of the conversion unit.

4. The image reading apparatus according to claim 1, wherein
the first reading unit includes a plurality of chips, and
the plurality of chips are grouped to correspond to an output channel, and a timing of an output of an analog signal is controlled for each group.

5. The image reading apparatus according to claim 4, wherein in the first reading mode, the plurality of grouped chips are configured such that an output of an analog signal from a first chip and an output of an analog signal from a second chip adjacent to the first chip are started in parallel.

6. The image reading apparatus according to claim 4, wherein in the second reading mode, the plurality of grouped chips are configured such that after an analog signal is outputted from a first chip, an output of an analog signal from a second chip adjacent to the first chip is started.

7. The image reading apparatus according to claim 6, wherein the output control unit, in the second reading mode, after an analog signal has been outputted from a last chip of the grouped chips of a first group, causes a leading chip among chips of a second group adjacent to the first group to output an analog signal.

8. The image reading apparatus according to claim 7, wherein an analog signal is outputted from the leading chip among the chips of the second group based on a level of a signal of a logical sum of a level of a signal that indicates either the first reading mode or the second reading mode and a level of a signal that indicates that an analog signal has been outputted from the last chip.

9. The image reading apparatus according to claim 8, wherein the output control unit, by changing the level of the signal that indicates either the first reading mode or the second reading mode, is configured to control a timing of an output of an analog signal from the leading chip among the chips of the second group.

10. The image reading apparatus according to claim 1, wherein the first reading unit and the second reading unit are contact image sensors.

11. The image reading apparatus according to claim 1, wherein the first reading unit is used at a time of reading a first side of an original, and the second reading unit is used at a time of reading a second side, which is a back side of the first side, of the original.

12. The image reading apparatus according to claim 1, wherein the first reading unit is used at a time of reading an original of a first size and a second size that is larger than the first size, and the second reading unit is not used at a time of reading an original of the first size and is used at a time of reading an original of the second size.

13. The image reading apparatus according to claim 1, wherein
the wire connection control unit is configured to,
in the first reading mode, control the wire connection such that an analog signal outputted from a first output channel of the first reading unit is inputted to a first input channel of the conversion unit, an analog signal outputted from a second output channel of the first reading unit is inputted to a second input channel of the conversion unit, an analog signal outputted from a third output channel of the first reading unit is inputted to a third input channel of the conversion unit, and an analog signal outputted from a fourth output channel of the first reading unit is inputted to a fourth input channel of the conversion unit, and,
in the second reading mode, control the wire connection such that the analog signal outputted from the first output channel and the analog signal outputted from the second output channel of the first reading unit are inputted to the first input channel of the conversion unit, the analog signal outputted from the third output channel and the analog signal outputted from the fourth output channel of the first reading unit are inputted to the second input channel of the conversion unit, the analog signal outputted from the first output channel of the second reading unit is inputted to the third input channel of the conversion unit, and the analog signal outputted from the second output channel of the second reading unit is inputted to the fourth input channel of the conversion unit.

* * * * *